US008827047B2

(12) United States Patent
Baker et al.

(10) Patent No.: US 8,827,047 B2
(45) Date of Patent: Sep. 9, 2014

(54) GROUND-ENGAGING VEHICLE BRAKING SYSTEM AND METHODS FOR USING THE SAME

(75) Inventors: Wilfred Jerome Baker, Gainesville, FL (US); Carl D. Crane, Gainesville, FL (US); Shannon Cay Ridgeway, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 128 days.

(21) Appl. No.: 13/553,432

(22) Filed: Jul. 19, 2012

(65) Prior Publication Data

US 2013/0037355 A1 Feb. 14, 2013

Related U.S. Application Data

(60) Provisional application No. 61/572,591, filed on Jul. 19, 2011.

(51) Int. Cl.
 *B60T 1/14* (2006.01)
(52) U.S. Cl.
 CPC ........................................ *B06T 1/14* (2013.01)
 USPC .................................. 188/5; 188/4 R; 188/32
(58) Field of Classification Search
 USPC ........................................ 188/4 R, 5, 6, 7, 32
 See application file for complete search history.

(56) References Cited

U.S. PATENT DOCUMENTS

| | | | | | |
|---|---|---|---|---|---|
| 1,116,235 | A | * | 11/1914 | Brown | 188/5 |
| 1,136,145 | A | * | 4/1915 | Koppelman | 188/5 |
| 1,145,592 | A | * | 7/1915 | Jenkins | 188/5 |
| 1,282,054 | A | * | 10/1918 | Dorohon | 188/5 |
| 1,384,589 | A | * | 7/1921 | Blaney | 188/4 R |
| 1,422,285 | A | * | 7/1922 | Majors | 188/2 R |
| 1,486,920 | A | * | 3/1924 | Randall | 188/5 |
| 1,909,609 | A | * | 5/1933 | Carlson | 188/5 |
| 1,924,276 | A | * | 8/1933 | Gerstenberger | 254/423 |
| 2,692,658 | A | * | 10/1954 | Bigio | 188/5 |
| 2,730,196 | A | * | 1/1956 | Besoyan | 188/4 R |
| 2,747,692 | A | * | 5/1956 | Holmes | 188/5 |
| 2,796,150 | A | * | 6/1957 | Gambardella | 188/5 |
| 2,847,092 | A | * | 8/1958 | Noyes et al. | 188/5 |
| 2,886,139 | A | * | 5/1959 | Wilson | 188/5 |
| 3,005,521 | A | * | 10/1961 | Blain | 188/5 |
| 3,042,150 | A | * | 7/1962 | Lukawsky | 188/4 R |
| 3,625,313 | A | * | 12/1971 | Lowrie | 188/4 R |
| 3,735,841 | A | * | 5/1973 | Auriemma | 188/5 |
| 4,066,151 | A | * | 1/1978 | Liebscher et al. | 188/5 |
| 5,497,857 | A | * | 3/1996 | Warren et al. | 188/4 R |
| 5,899,496 | A | * | 5/1999 | Muraro | 280/765.1 |
| 6,401,876 | B1 | * | 6/2002 | Boros | 188/5 |
| 7,950,501 | B2 | * | 5/2011 | Takahashi | 188/5 |

* cited by examiner

*Primary Examiner* — Thomas J Williams
*Assistant Examiner* — Mariano Sy
(74) *Attorney, Agent, or Firm* — Alston & Bird LLP

(57) ABSTRACT

Various embodiments provide a ground-engaging vehicle braking assembly for a vehicle. The assembly generally comprises: a base subassembly mounted to a portion of the vehicle; a common member comprising a first portion and a second portion, the first portion of the common member being rotatably attached to the base subassembly; a first linkage subassembly comprising the first portion of the common member; and a second linkage subassembly comprising the second portion of the common member and a pad member, the pad member being configured to engage a ground surface over which the portion of the vehicle is travelling. An associated method of operating the assembly is also provided, wherein multiple modes of operation are incorporated. A system is also described, wherein at least one processor is configured to move various linkage subassemblies of the assembly based upon one or more predetermined parameters related to mode of operation.

24 Claims, 15 Drawing Sheets

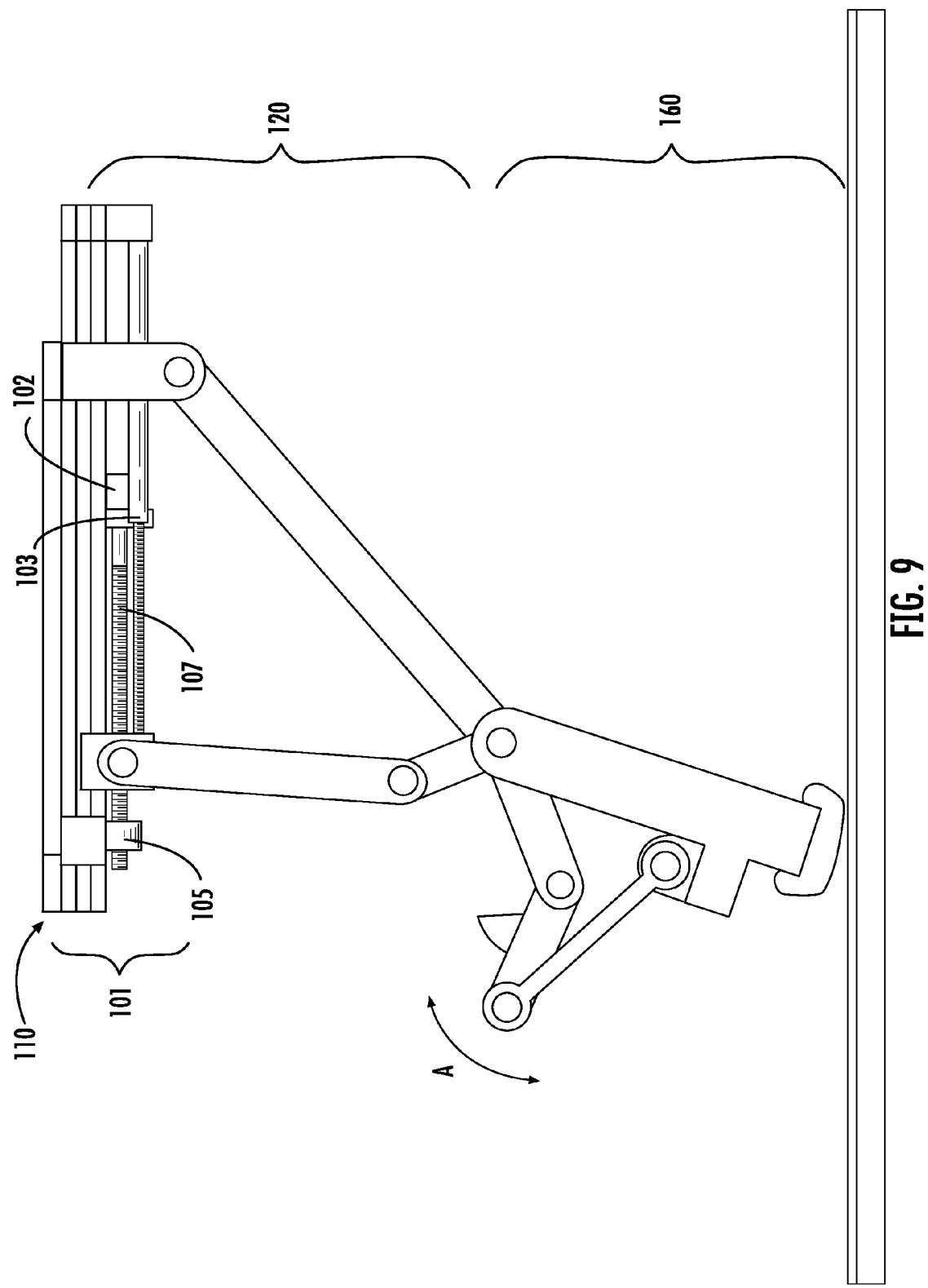

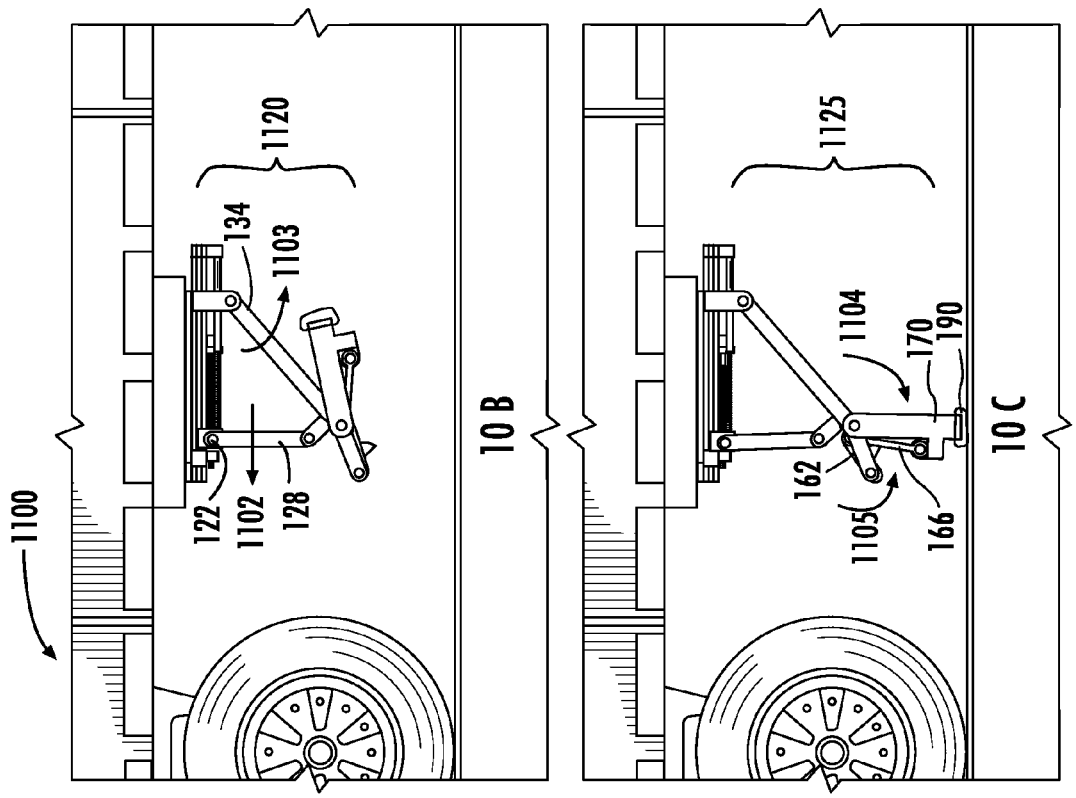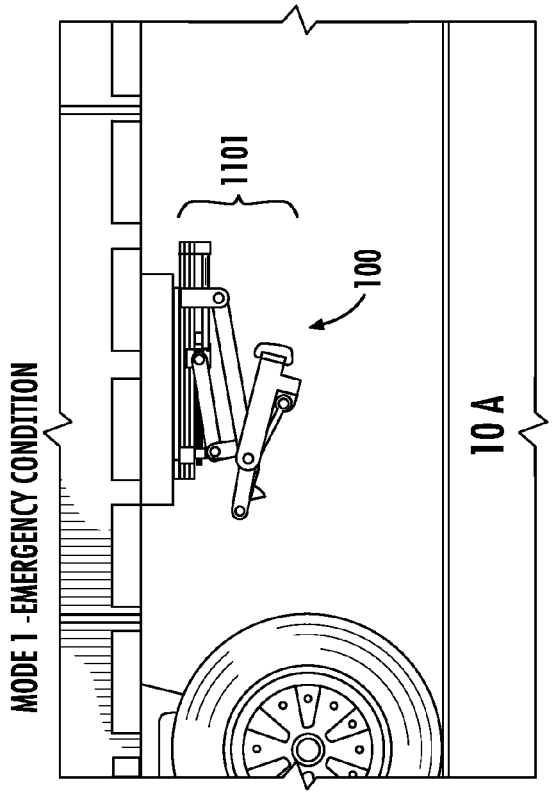
FIGS. 10 A-C

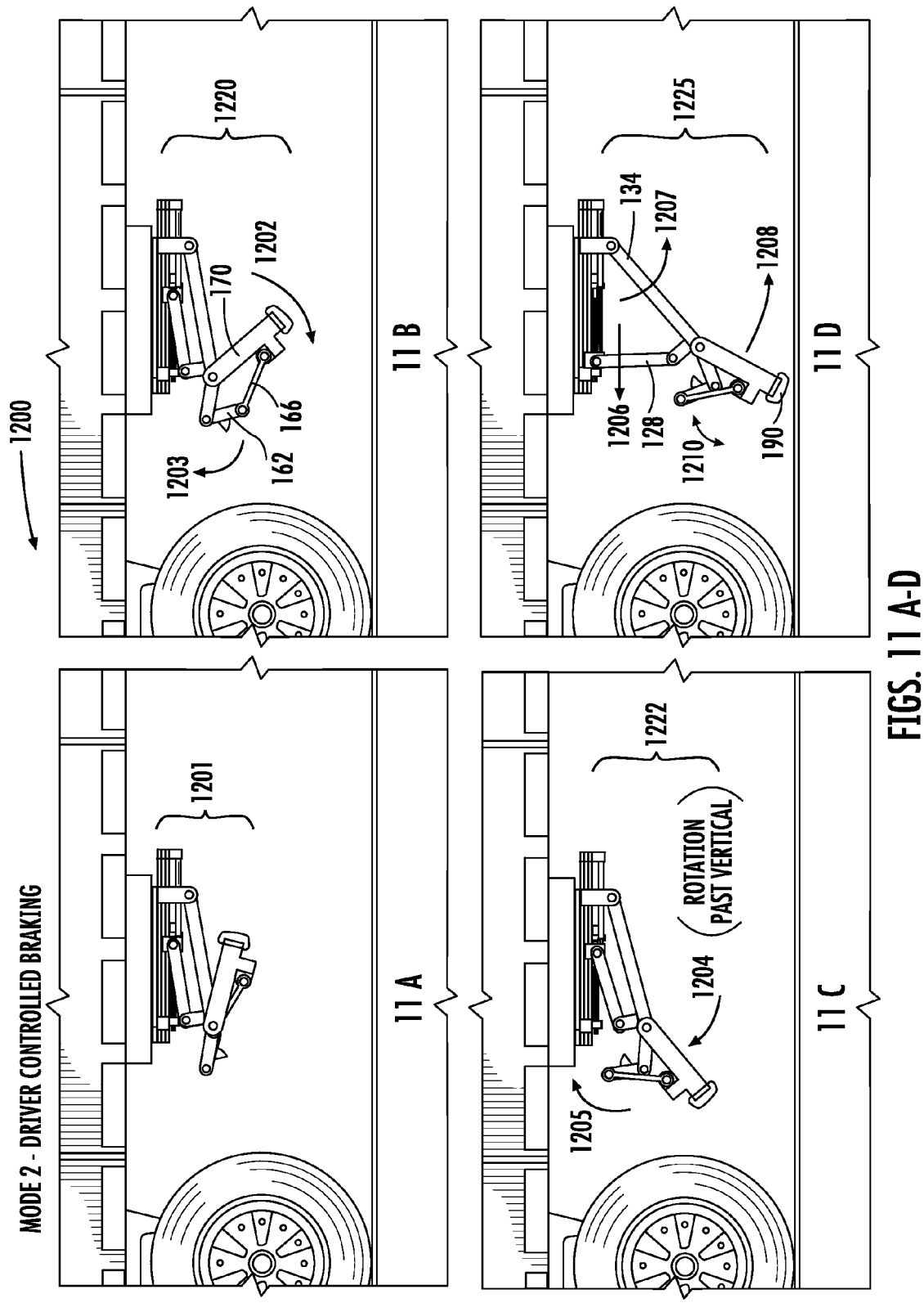
FIGS. 11 A-D

GROUND-ENGAGING VEHICLE BRAKING SYSTEM AND METHODS FOR USING THE SAME

CROSS-REFERENCE TO RELATED APPLICATIONS

This application claims priority from U.S. Provisional Application No. 61/572,591, filed Jul. 19, 2011, which is herein incorporated by reference in its entirety.

BACKGROUND

1. Related Field

Various embodiments of the present invention relate generally to systems and methods for selectively controlling braking operations of a vehicle or a trailer towed thereby by one or more of activating, deploying, manipulating, and retracting a ground-engaging vehicle braking system so as to assist a driver of the vehicle to maintain control under adverse driving conditions such as snow, ice, wet roads, slippery terrain, mountainous or steep terrain, and the like. The systems and methods of the various embodiments are particularly useful for tractor-trailer rigs, where the risk of jackknifing and/or primary brake failure increases under such adverse driving conditions. Other applications may involve the non-limiting examples of buses, whether in the public transportation or school context, or otherwise.

2. Description of Related Art

Vehicles, and in particular trailers pulled by a vehicle, in particular tractor-trailer rigs, have been used for many years to carry a great variety of goods on open roads. Control of the vehicle and/or trailer while braking has always been a significant problem and continues to result in loss of life and property. As a non-limiting example, if traction between the trailer's wheels and a road surface is diminished or lost, the trailer becomes subject to lateral skid forces that may result in sideways sliding of the trailer and/or jackknifing. Comparable scenarios exist for extended length vehicles, such as, for example, buses. Additionally, on severe grades or even elsewhere, the primary braking system of extended vehicles and/or towed trailers oftentimes become overheated, resulting in, at worst, inoperability. When any of these scenarios occur, there is very little that a driver of the vehicle can do to rectify the situation since further braking either exacerbates the overheating or accelerates an encountered skid.

While various systems have been proposed to prevent or at least inhibit the adverse effects of brake malfunction and/or trailer jackknifing, such systems are oftentimes complicated and difficult or expensive to install, particularly in a retrofit operation, as many require bodily incorporation with the vehicle's (e.g., truck rig's) braking system. Moreover, many drivers are wary of such systems, as they inevitably take a degree of braking control away from the driver. Accordingly, there is a need for an inexpensive, simplistic system that may both automatically and/or selectively control braking operations, without the need for continuous oversight by a driver. Furthermore, it would be advantageous to provide a system that could be interchangeably employed in new vehicles and trailers as well as retrofitted into existing vehicles and trailers.

BRIEF SUMMARY

Generally described, the present invention to provide systems and methods for selectively controlling braking operations of a vehicle or a trailer towed thereby by one or more of activating, deploying, manipulating, and retracting a ground-engaging vehicle braking system.

In accordance with the various embodiments of the present invention as described herein, a ground-engaging vehicle braking assembly for a vehicle is provided. The assembly comprises: a base subassembly mounted to a portion of the vehicle; a common member comprising a first portion and a second portion, the first portion of the common member being rotatably attached to the base subassembly; a first linkage subassembly comprising the first portion of the common member; and a second linkage subassembly comprising the second portion of the common member and a pad member, the pad member being configured to engage a ground surface over which the vehicle is travelling.

In accordance with the various embodiments of the present invention as described herein, a method for operating a ground-engaging vehicle braking assembly for a vehicle is provided. The method comprises the steps of: providing a ground-engaging vehicle braking assembly, the assembly comprising a base subassembly and a common member having a first portion and a second portion, the first portion forming at least a portion of a first linkage subassembly, the second portion forming at least a portion of a second linkage subassembly; moving the first linkage subassembly from a first configuration to a second configuration, such that at least the first portion of the common member rotates relative to the base subassembly; and moving the second linkage subassembly from a first configuration to a second configuration, such that at least a portion of the second linkage subassembly engages a ground surface over which the vehicle is traveling.

In accordance with the various embodiments of the present invention as described herein, a system providing a ground-engaging vehicle braking assembly for a vehicle is provided. The system comprises: a ground-engaging vehicle braking assembly, the assembly comprising a base subassembly and a common member having a first portion and a second portion, the first portion forming at least a portion of a first linkage subassembly, the second portion forming at least a portion of a second linkage subassembly; at least one actuator; and at least one processor. The processor is configured to: monitor at least one of an operator controlled device and one or more sensors; in response to identifying one or more predetermined parameters associated with the one or more sensors, first move the first linkage subassembly from a first configuration and into a second configuration and then move the second linkage subassembly from a first configuration and into a second configuration, such that at least a portion of the second linkage subassembly substantially engages a ground surface over which the vehicle is traveling; and in response to identifying one or more predetermined parameters associated with the operator controlled device, first move second linkage subassembly from the first configuration and into a third configuration, the second configuration being intermediately positioned relative to the first and the third configurations, then move the first linkage subassembly from the first configuration and into the second configuration, and then move the second linkage subassembly from the third configuration and into the second configuration, such that at least a portion of the second linkage subassembly substantially engages a ground surface over which the vehicle is traveling.

Other aspects, features, and advantages of the present invention will become apparent upon reading the following detailed description of the preferred embodiment of the invention when taken in conjunction with the drawing and the appended claims.

BRIEF DESCRIPTION OF THE SEVERAL VIEWS OF THE DRAWING(S)

In the description below, reference will be made to the accompanying drawings, which are not necessarily drawn to scale. Like numbers refer to like elements throughout.

Figure 2:
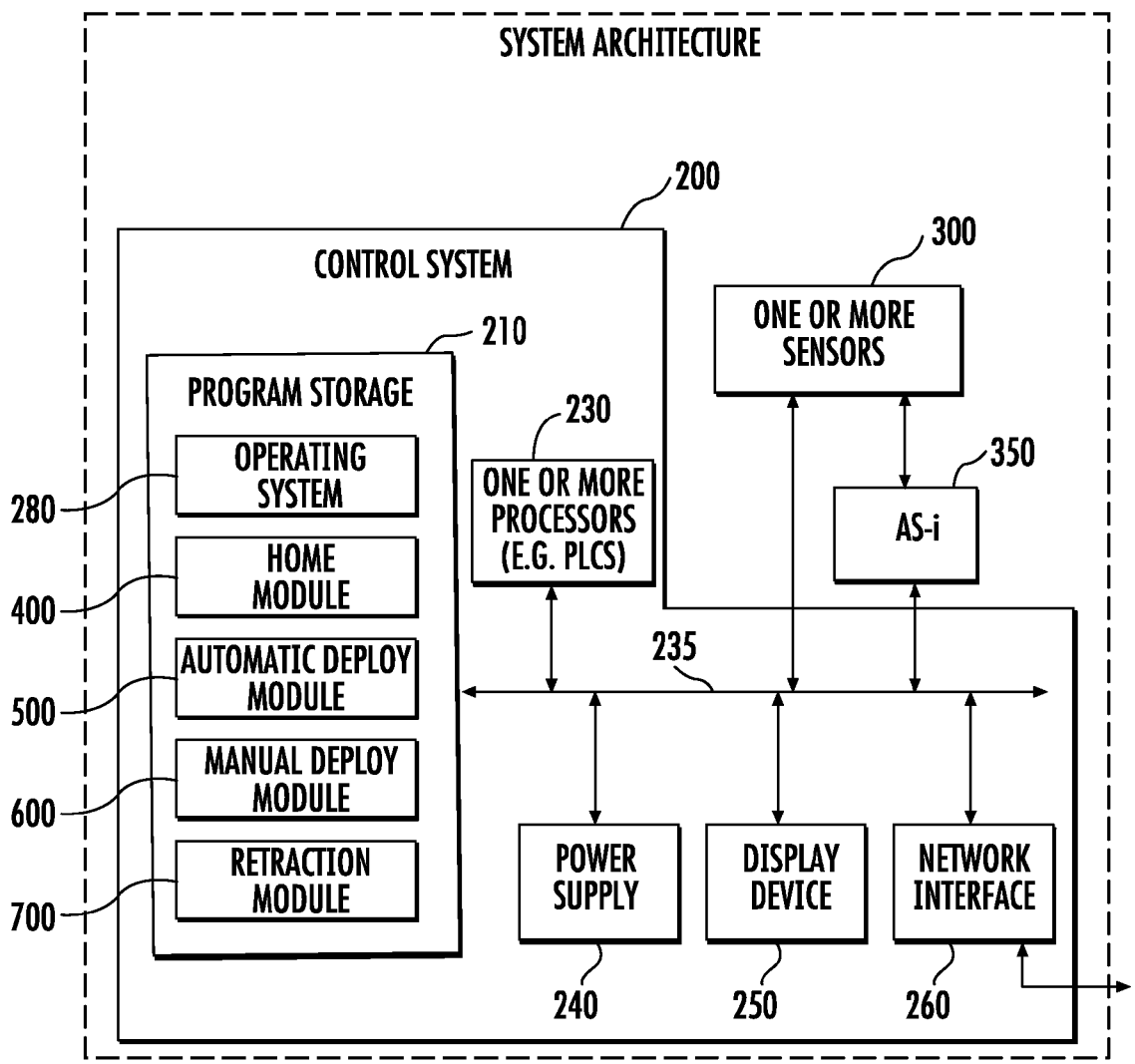
FIG. 2 is schematic block diagram of a control system 200 of the ground-engaging braking system 5 according to various embodiments.
Figure 3:
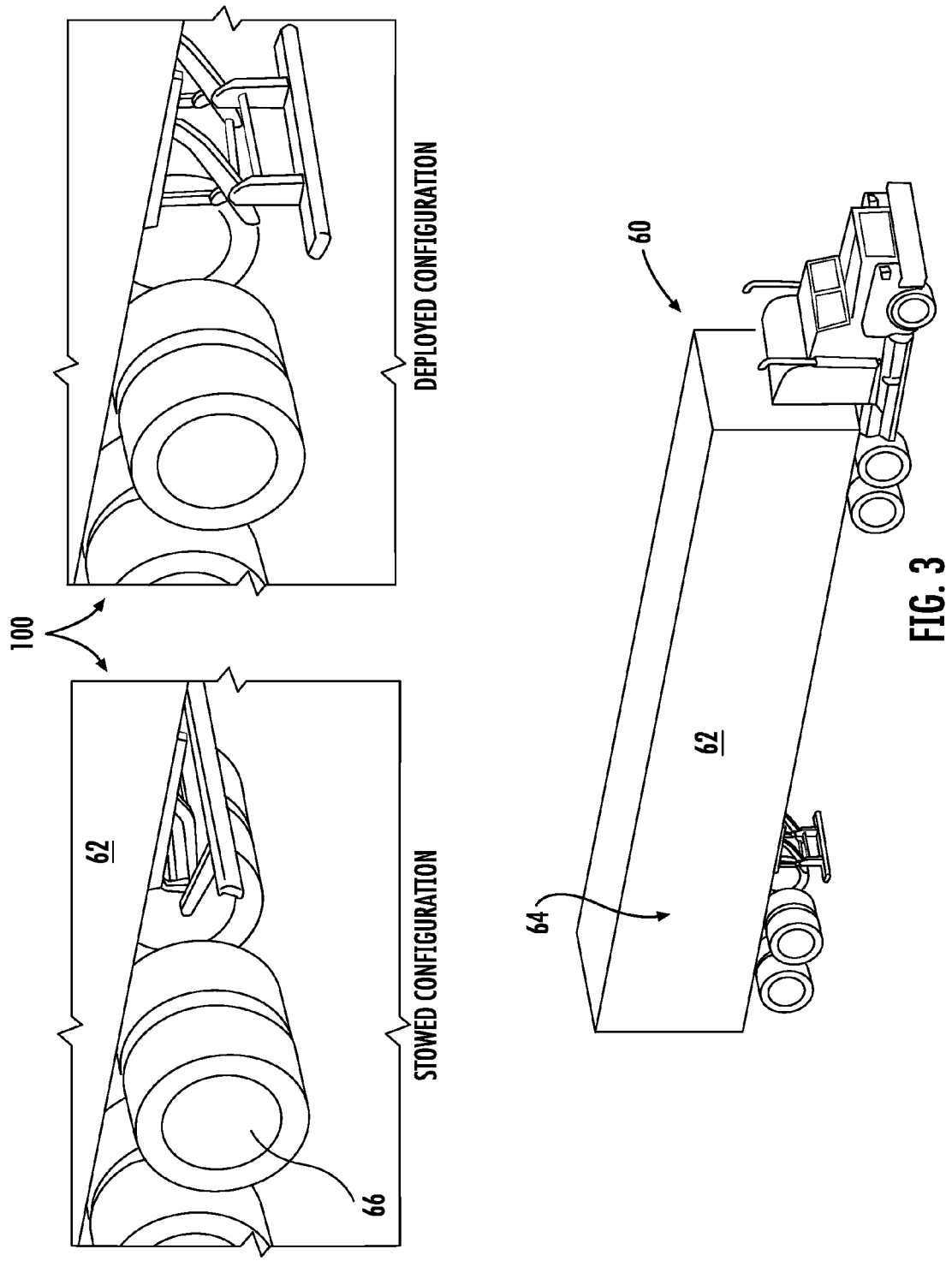
Figure 4:
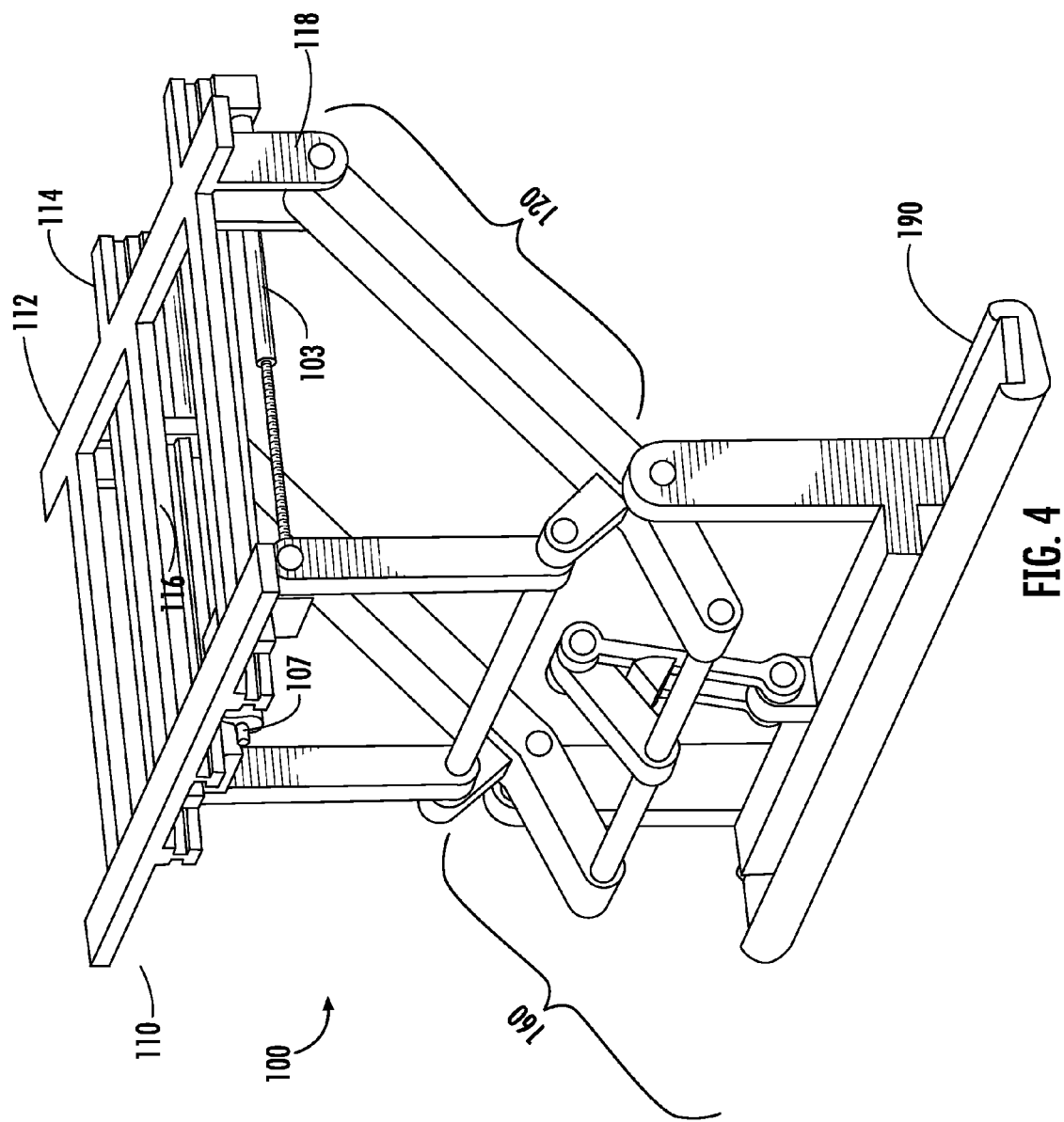
Figure 5:
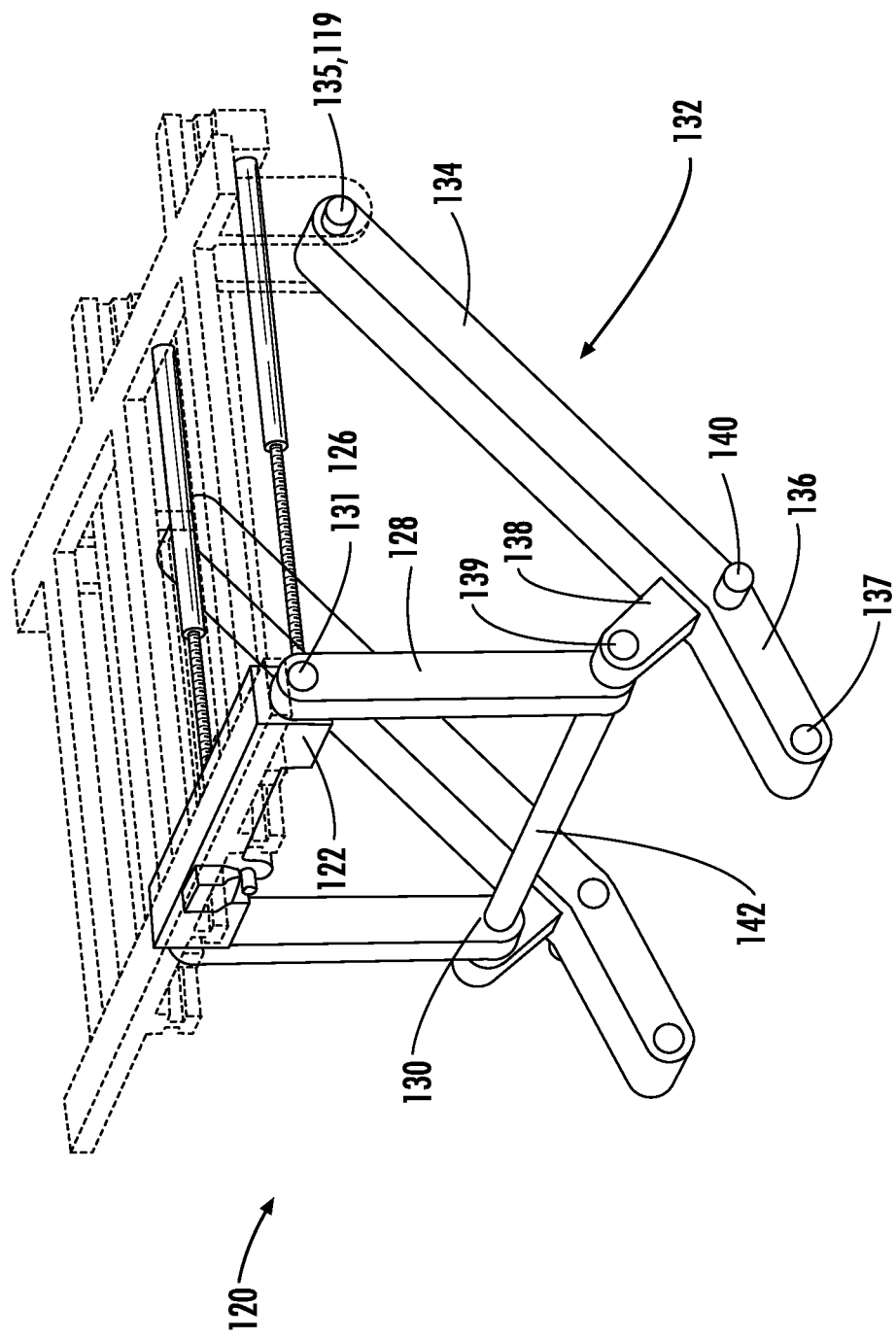
Figure 6:
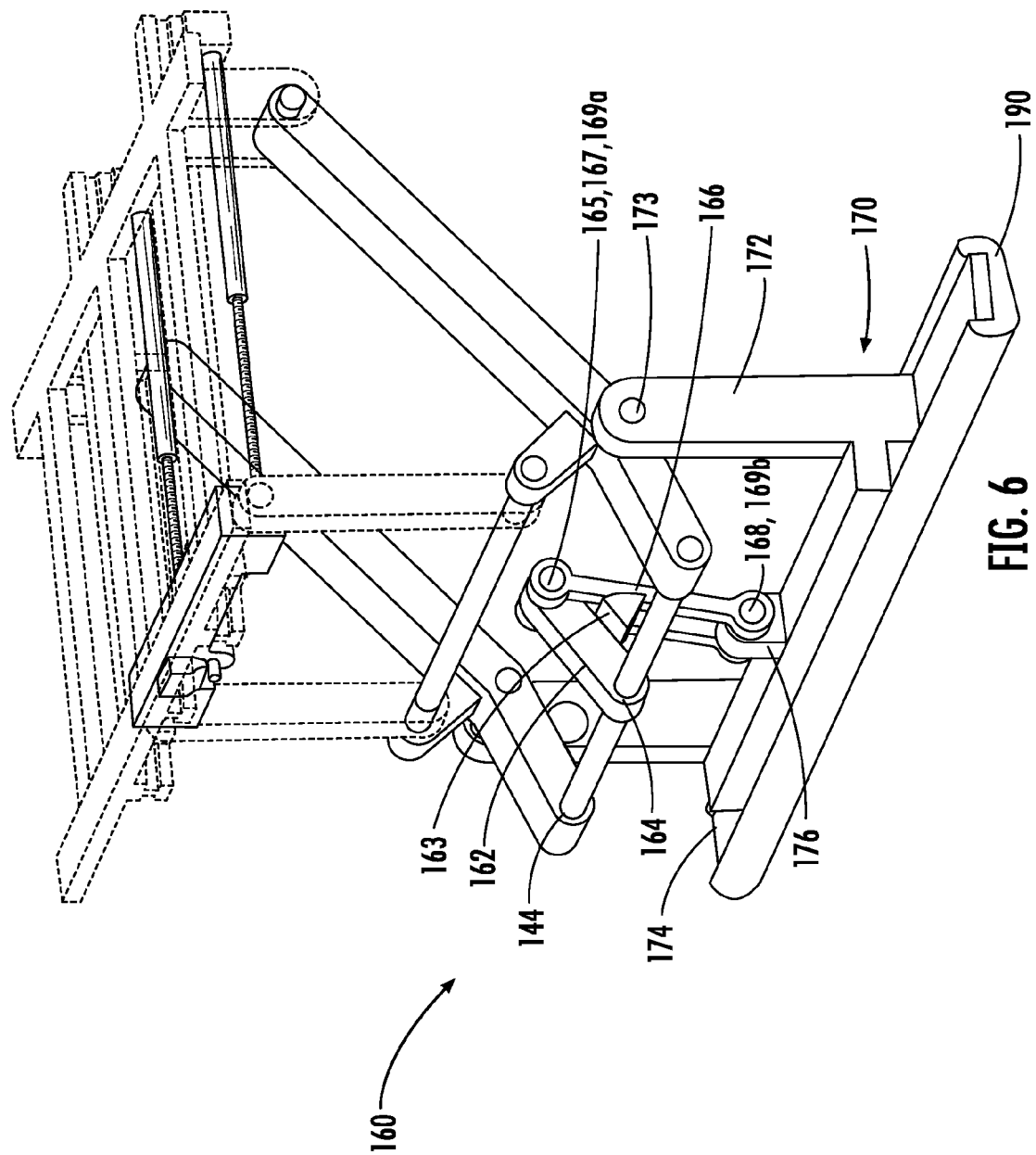
Figure 7:
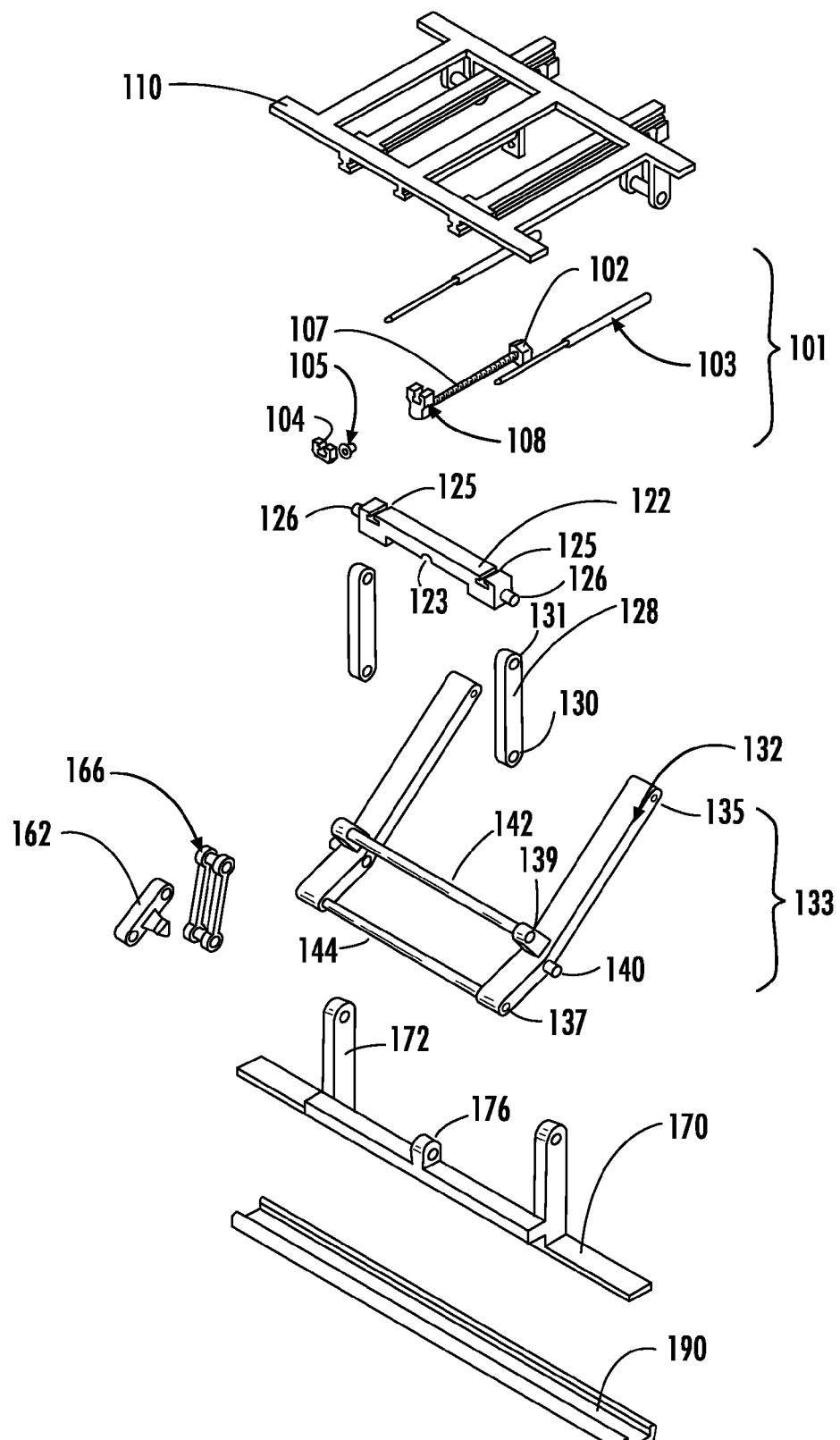
Figure 8:
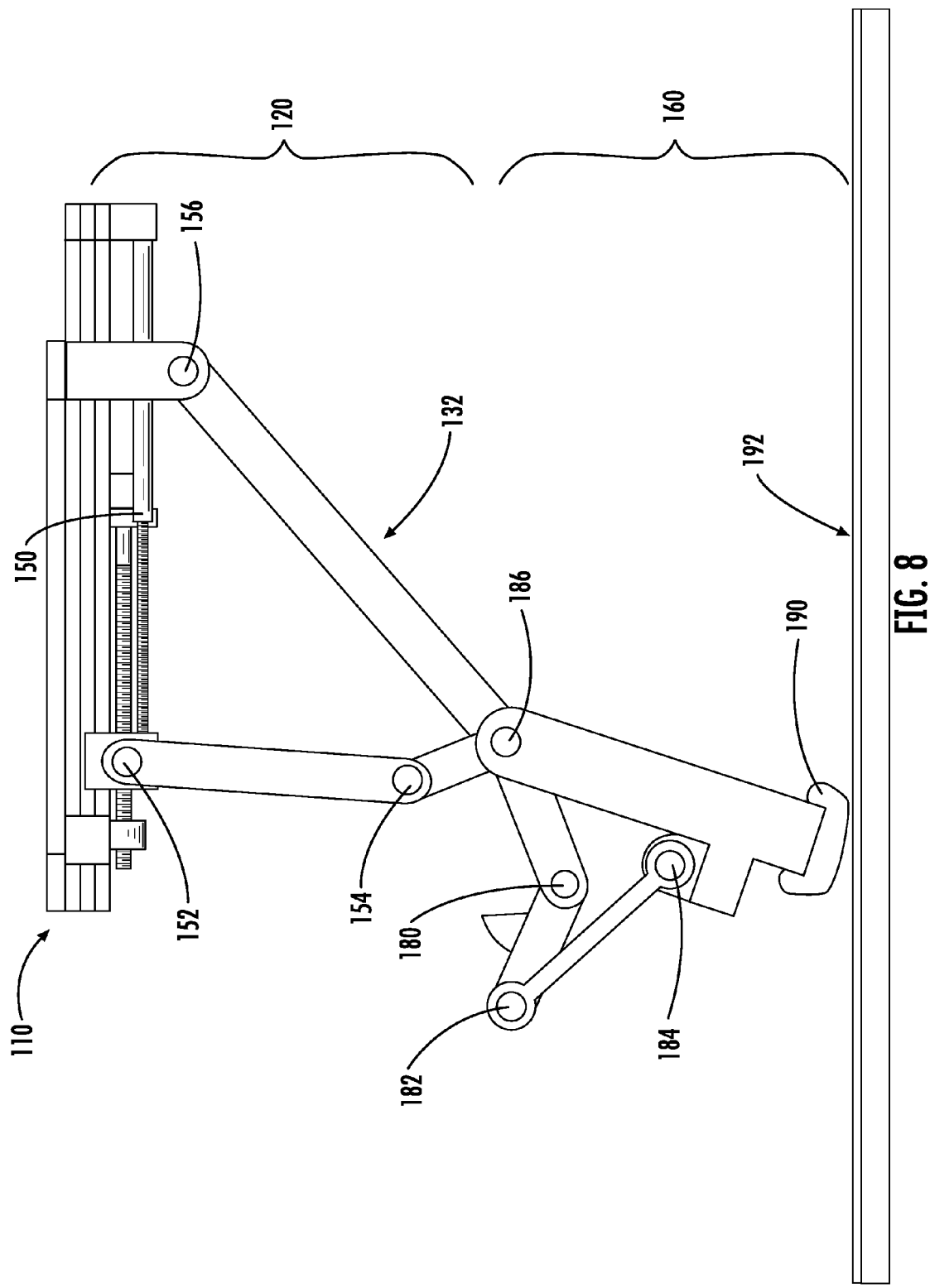
Figure 12:
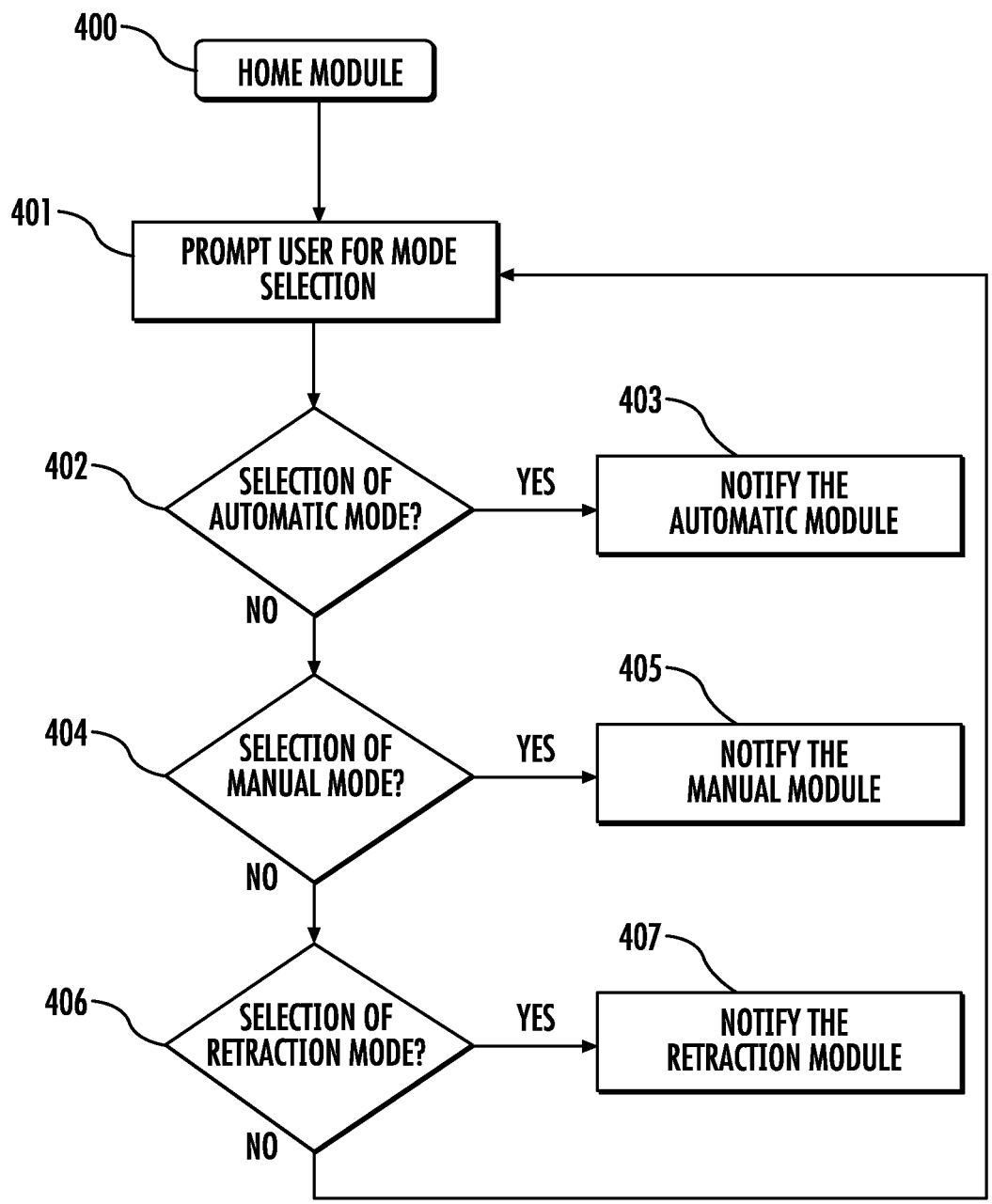
Figure 13:
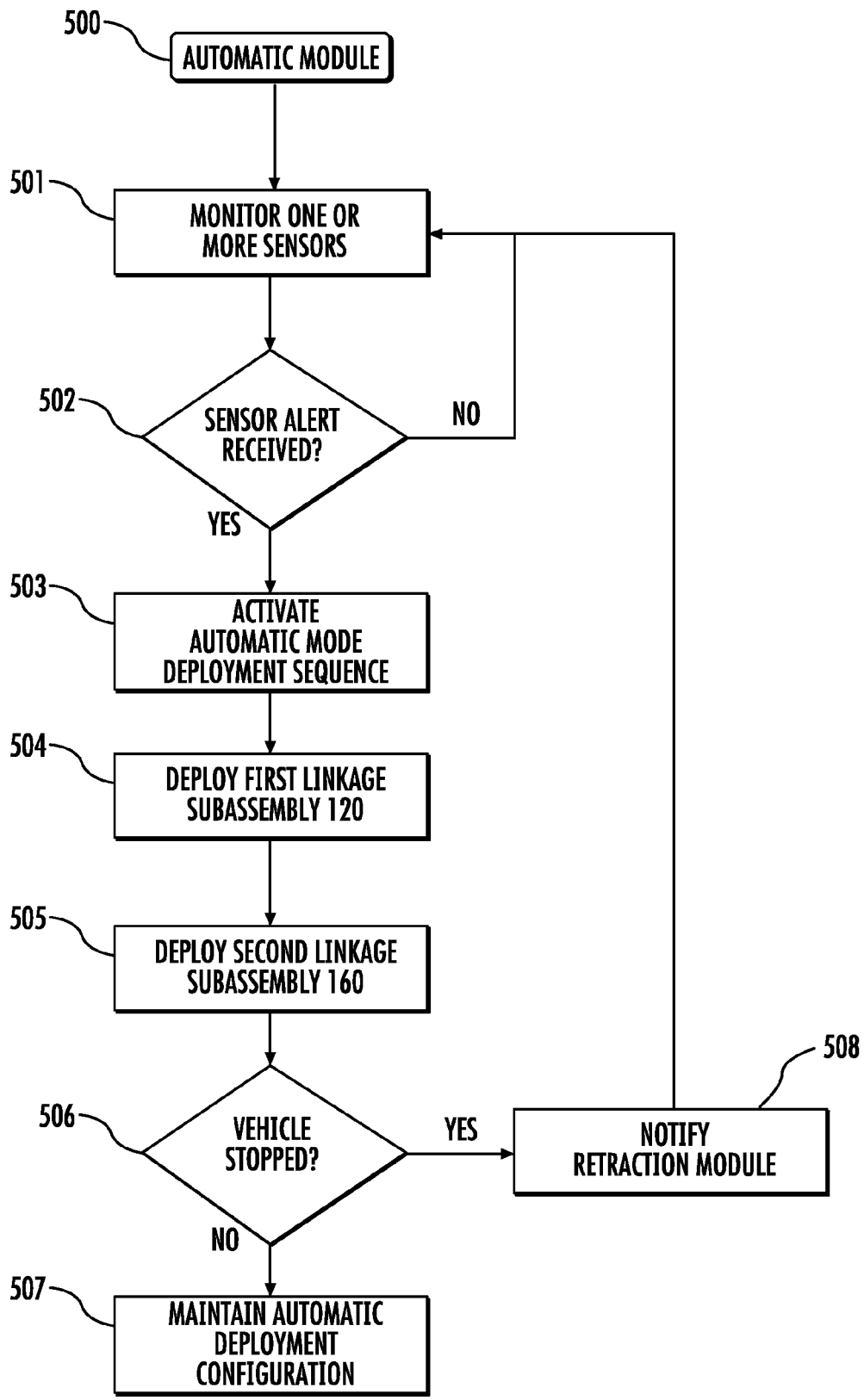
Figure 14:
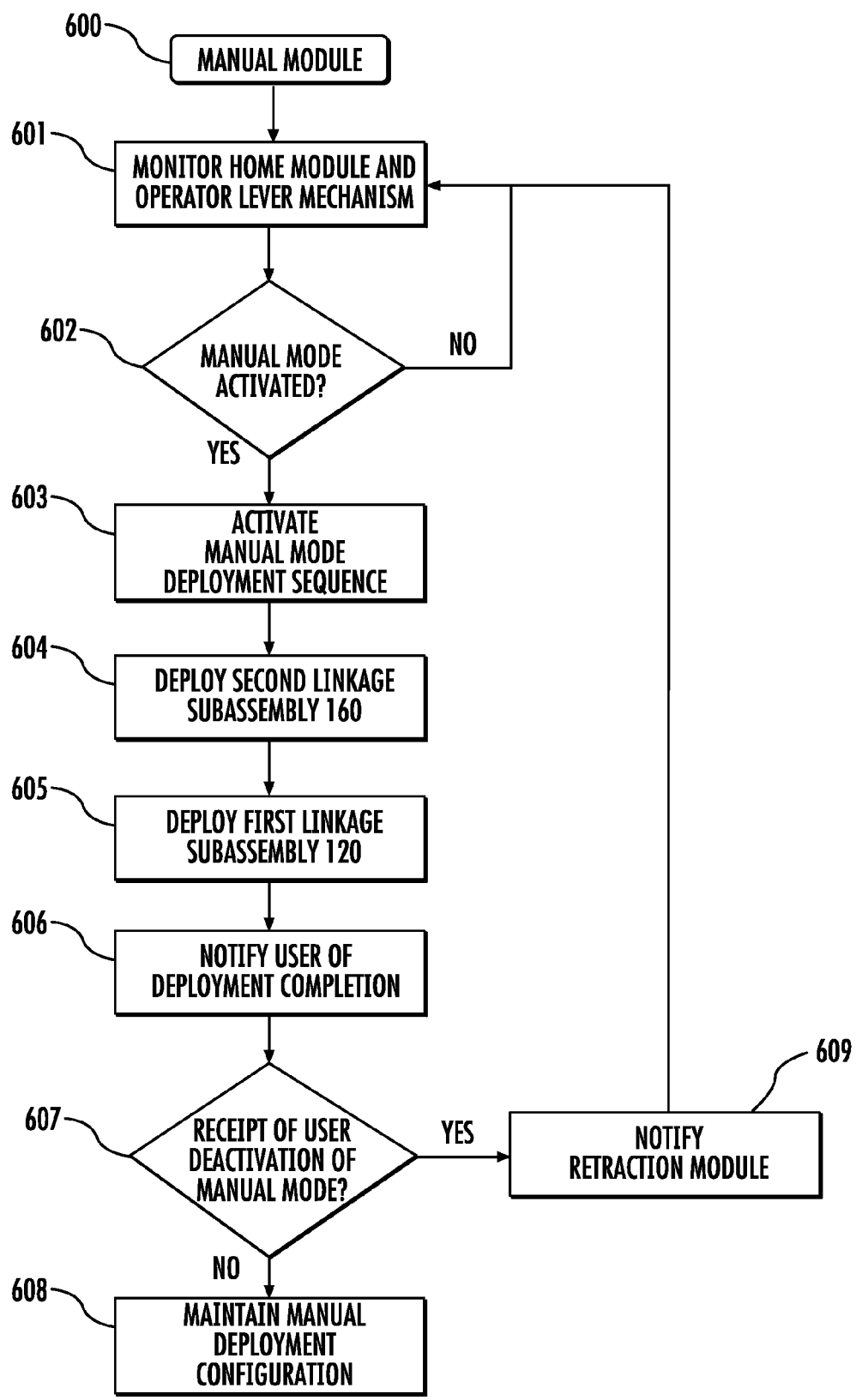
Figure 15:
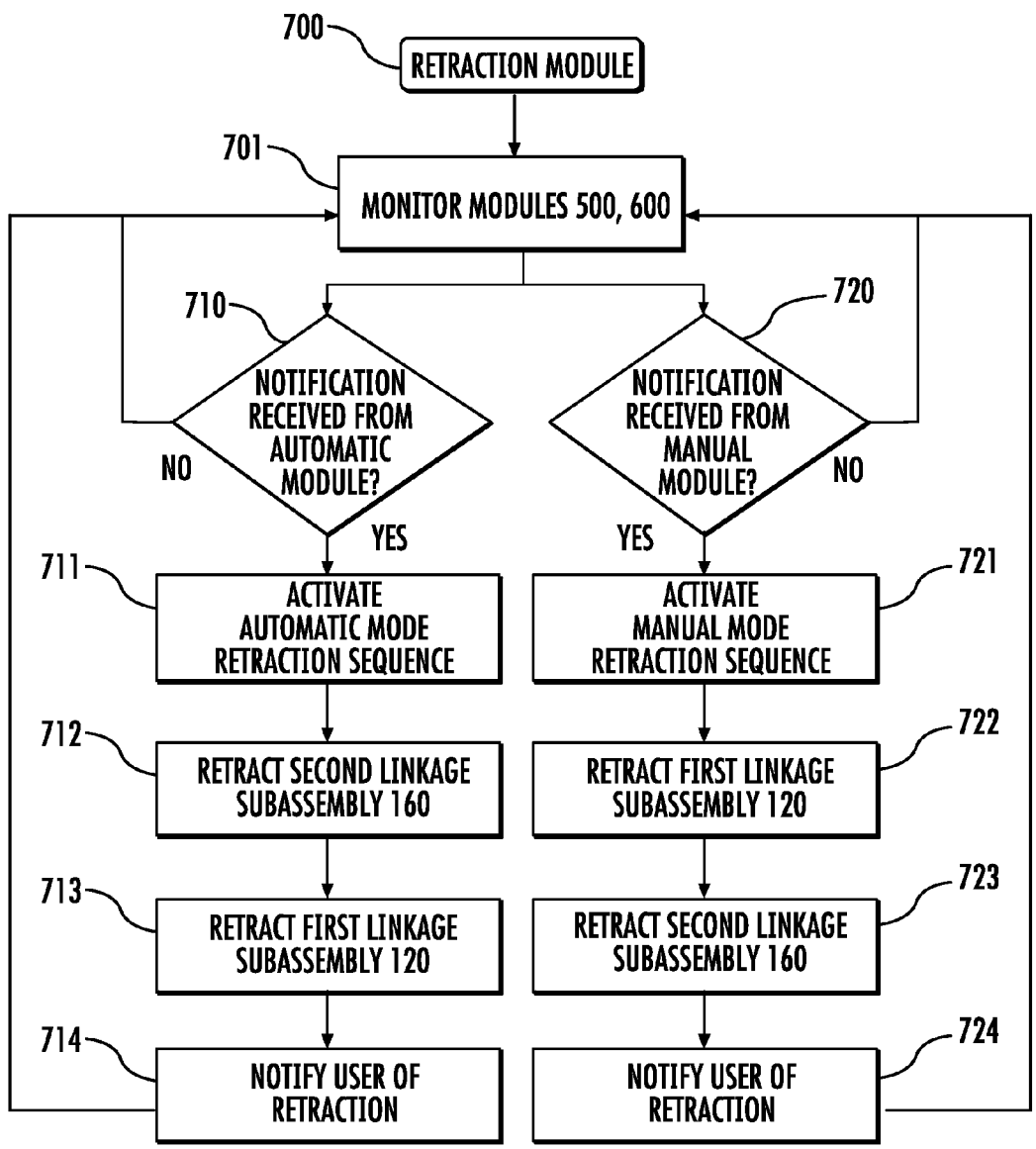

FIG. 3 is a set of perspective views, illustrating exemplary stowed and deployed configurations of a braking assembly 100 of the braking system 5, as mounted to a tractor-trailer rig 60 according to various embodiments;

FIG. 4 is a more detailed perspective view of the braking assembly 100 according to various embodiments;

FIG. 5 is a detailed perspective view of a first linkage sub-assembly 120 of the braking assembly 100 according to various embodiments;

FIG. 6 is a detailed perspective view of a second linkage sub-assembly 160 of the braking assembly 100 according to various embodiments;

FIG. 7 is an exploded perspective view of various sub-elements of the first and second linkage subassemblies 120, 160 of the braking assembly 100 according to various embodiments;

FIG. 8 is an elevation view of the first and second linkage sub-assemblies 120, 160 of FIGS. 5-6, further illustrating a plurality of joints associated therewith according to various embodiments;

FIG. 9 is an elevation view of the first and second linkage subassemblies 120, 160 of FIGS. 5-6, further illustrating a base sub-assembly 110 according to various embodiments;

FIG. 10A is an elevation view of the braking assembly 100 in an exemplary stowed configuration 1101 according to various embodiments;

FIG. 10B is an elevation view of the braking assembly 100 in a first intermediate configuration 1120 according to various embodiments;

FIG. 10C is an elevation view of the braking assembly 100 in a first deployed configuration 1125 according to various embodiments;

FIG. 11A is an elevation view of the braking assembly 100 in an exemplary stowed configuration 1201 according to various embodiments;

FIG. 11B is an elevation view of the braking assembly 100 in a second intermediate configuration 1220 according to various embodiments;

FIG. 11C is an elevation view of the braking assembly 100 in a third intermediate configuration 1222 according to various embodiments;

FIG. 11D is an elevation view of the braking assembly 100 in a second deployed configuration 1225 according to various embodiments;

FIG. 12 is a flow diagram of steps executed by a home module 400 of the control system 200 of FIG. 2 according to various embodiments;

FIG. 13 is a flow diagram of steps executed by an automatic module 500 of the control system 200 of FIG. 2 according to various embodiments;

FIG. 14 is a flow diagram of steps executed by a manual module 600 of the control system 200 of FIG. 2 according to various embodiments; and FIG. 15 is a flow diagram of steps executed by a retraction module 700 of the control system 200 of FIG. 2 according to various embodiments.

DETAILED DESCRIPTION OF VARIOUS EMBODIMENTS

Various embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

Apparatuses, Methods, Systems, and Computer Program Products

As should be appreciated, various embodiments may be implemented in various ways, including as apparatuses, methods, systems, or computer program products. Accordingly, the embodiments may take the form of an entirely hardware embodiment, or an embodiment in which a programmable logic controller (PLC) or other analogous processor is programmed to perform certain steps. Furthermore, various implementations may take the form of a computer program product on a computer-readable storage medium having computer-readable program instructions embodied in the storage medium. In such embodiments, any suitable computer-readable storage medium may be utilized including hard disks, CD-ROMs, optical storage devices, or magnetic storage devices.

Various embodiments are described below with reference to block diagrams and flowchart illustrations of apparatuses, methods, systems, and computer program products. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus (e.g., a programmable logic controller (PLC)) to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus (e.g., PLC) to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus (e.g., a PLC) to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

System Architecture

Figure 1:
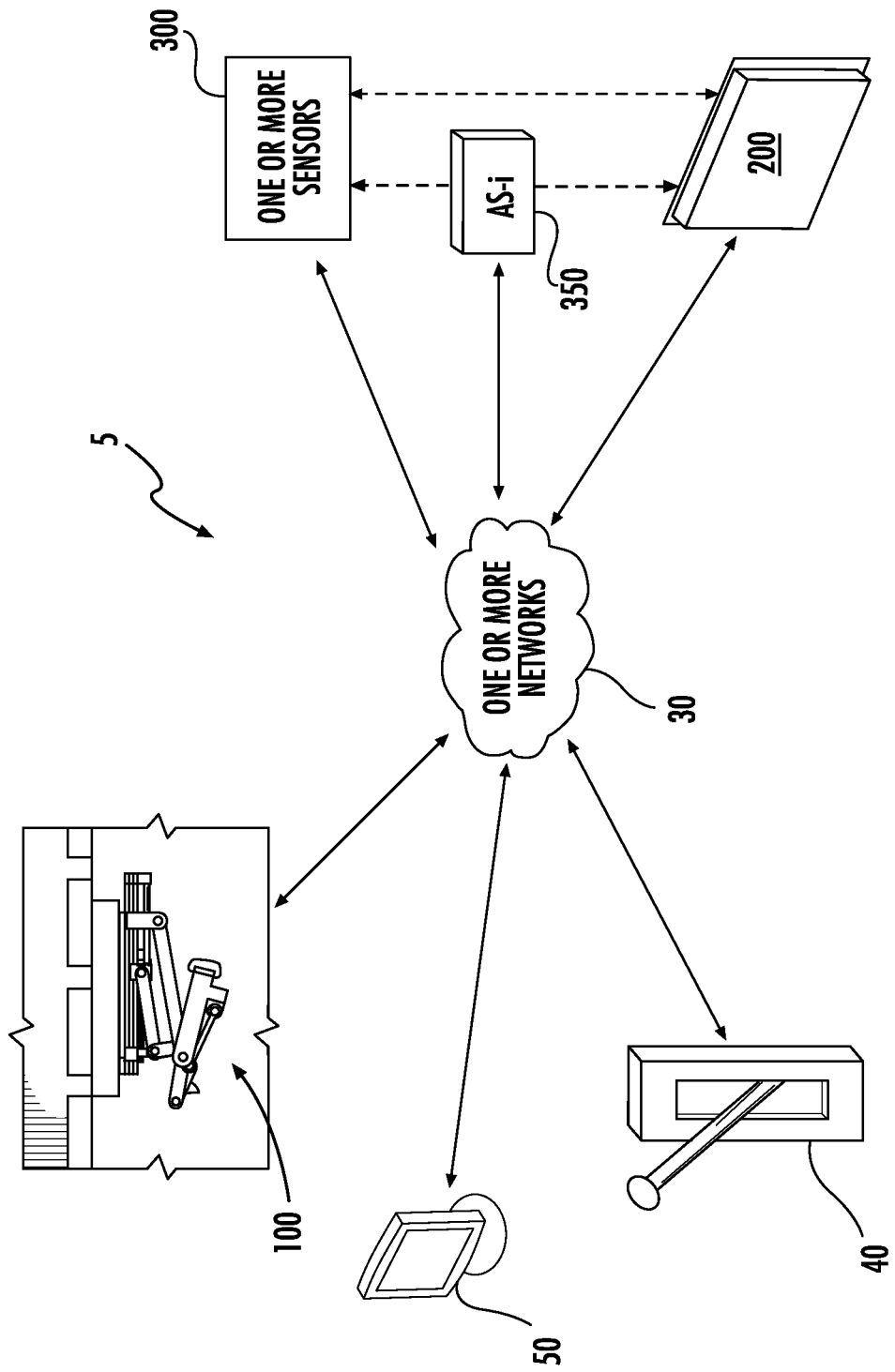
FIG. 1 is a block diagram of a ground-engaging braking system 5 according to various embodiments.

FIG. 1 provides an illustration of one type of a ground-engaging braking system 5 according to various embodiments of the present invention. In the illustrated embodiment, the system 5 may include one or more networks 30, an operator controlled device 40, an operator control panel 50, a braking assembly 100, a control system 200, an actuator sensor interface (AS-i) 350, and one or more sensors 300, all associated with and/or mounted on various portions of a vehicle configured to tow a trailer (see, e.g., FIG. 3). While FIG. 1 illustrates the various system entities as separate, standalone entities, it should be understood that the various embodiments are not limited to this particular architecture.

According to various embodiments of the present invention, the one or more networks 30 may be capable of supporting communication in accordance with any one or more of a number of second-generation (2G), 2.5G, third-generation (3G), and/or fourth-generation (4G) mobile communication protocols, or the like. More particularly, the one or more networks 30 may be capable of supporting communication in accordance with 2G wireless communication protocols IS-136 (TDMA), GSM, and IS-95 (CDMA). Also, for example, the one or more networks 30 may be capable of supporting communication in accordance with 2.5G wireless communication protocols GPRS, Enhanced Data GSM Environment (EDGE), or the like. In addition, for example, the one or more networks 30 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 5 may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), Controller Area Network ("CAN"), or the like.

Although the operator controlled device 40, the operator control panel 50, and the control system 200 are illustrated in FIG. 1 as communicating with one another over the same one or more networks 30, these devices may likewise communicate over multiple, separate networks. For example, while the operator control panel 50 may communicate with the control system 200 over a wireless personal area network (WPAN) using, for example, Bluetooth techniques, the operator control panel 50 may communicate with the control system 200 over a wireless wide area network (WWAN), for example, in accordance with EDGE, or some other 2.5G wireless communication protocol. In various embodiments, the operator control panel 50 may communicate with the control system 200 over a controller area network (CAN) bus, as commonly known and understood in the art to allow microcontrollers and associated devices to communicate with each other within a vehicle without a host computer. In these and still other embodiments incorporating a CAN-based network, it should be understood that various parameters regarding vehicle state may be queried via the operator controlled device 40, the operator control panel 50, and/or the control system 200, as may be desirable for various applications.

The operator controlled device 40 may be any of a variety of devices capable of receiving inputs from not only the control system 200 but also from the operator. In various embodiments, the operator controlled device 40 may be a device capable of manipulating one or more physical components of the braking assembly 100, upon operator demand. In at least one embodiment, the operator controlled device 40 may be a lever mechanism, as illustrated in at least FIG. 1 and as will be described in further detail below. In any of these and still other embodiments, the operator controlled device 40 may be further configured to be activated and/or disabled based at least in part upon data received via one or more input units or devices, such as the operator control panel 50 and/or the control system 200. In this manner, it should be understood that the operator controlled device 40 may be disabled in at least one operating mode of the ground-engaging braking system 5, such as, for example, the automatic (e.g., emergency) deployment mode, as will be described in much further detail further below. In any of these and still other embodiments, the operator control panel 50 may be fixedly mounted in the cab portion of a vehicle comprising the ground-engaging braking system 5, so that the operator may manipulate the same during operation of the vehicle itself.

The operator control panel 50, in various embodiments, may likewise be any device capable of receiving data via one or more input units or devices, such as a keypad, touchpad, interface card (e.g., modem, etc.), or receiver (not shown). The operator control panel 50 may further be capable of storing data to one or more volatile or non-volatile memory modules, and outputting the data via one or more output units or devices, for example, by displaying data to the user operating the panel 50, or by transmitting data, for example, over the network 30.

In certain embodiments, the operator control panel 50 may be fixedly mounted in the cab portion of a vehicle comprising the ground-engaging braking system 5, although in other embodiments, the control panel 50 may be selectively removable from the vehicle, for example, to be carried physically by the operator (e.g., as a handheld device or the like, as may be desirable in certain applications). In this manner, the operator control panel 50 may in any of these and still other embodiments be configured for manipulation by an operator of a vehicle while in use and/or in instances requiring troubleshooting of, for example, the braking assembly 100 located on the trailer portion of the vehicle, as will be described in further detail below.

Control System Architecture

In various embodiments, the control system 200 includes various systems for performing one or more functions in accordance with embodiments of the present invention, including those more particularly shown and described herein. It should be understood, however, that the control system 200 might include a variety of alternative devices for performing one or more like functions, without departing from the spirit and scope of the present invention. For example, at least a portion of the control system 200, in certain embodiments, may be located and/or carried out via the operator controlled device 40 and/or the operator control panel 50.

FIG. 2 is a schematic diagram of the control system architecture that, according to various embodiments may include a control system 200, one or more sensors 300, an actuator sensor interface (AS-i) 350. As may be seen from FIG. 2, the control system 200 in certain embodiments may include a power supply 240 and one or more processors 230 that communicate with other elements via a system interface or bus 235. In certain embodiments, the one or more processors 230 may comprise at least one programmable logic controller (PLC), as commonly known and understood in the art. Also included in the control system 205 may be a display/input device 250 for receiving and displaying data, although in certain embodiments, the control system 200 may merely use a portion of the operator controlled device 40 and/or the operator control panel 50 as display/input devices, as may be desirable in certain applications. In those embodiments having a separate display/input device 250, such may be, as a non-limiting example, a keyboard or pointing device that is used in combination with a monitor. In certain embodiments, it may also be possible to utilize existing vehicle interface hardware for the operator control panel 50 and/or any display/input device(s) 250, as commonly known and understood in the art.

Also located within the control system 200 may be a network interface 260 for interfacing and communicating with other elements via the one or more networks 30. It will be appreciated by one of ordinary skill in the art that one or more of the control system 200 components may be located geographically remotely from other control system components. Furthermore, one or more of the control system 200 components may be combined, and/or additional components performing functions described herein may also be included in the control system.

As further illustrated in FIG. 2, according to various embodiments, a number of program modules may also be located within the control system 200. The program modules may be stored by various storage devices in, for example, program storage 210. Such program modules may include in various embodiments an operating system 280, a home module 400, an automatic deployment module 500, a manual deployment module 600, and a retraction module 700. According to certain embodiments, these modules 400, 500, 600, and 700, direct certain aspects of the operation of the control system 200 with the assistance of the processor 230 and operating system 280. According to various embodiments, the modules 400, 500, 600, and 700, may send data to, receive data from, and utilize data contained in, a database, which may be comprised of one or more separate, linked and/or networked databases.

In general, according to various embodiments, the home module 400 may be configured to provide a screen display via which an operator may access certain features related to any of the remaining modules and/or provide alerts regarding various observed conditions. In these and other embodiments, the automatic deployment module 500 may be configured to monitor one or more sensors and upon receipt of an alert (e.g., regarding, for example, an adverse condition), activate an emergency-mode deployment sequence for the braking assembly 100, as will be described in much further detail later below. In a similar fashion, the manual deployment module 500 may be configured to activate a manual-mode deployment sequence for the braking assembly 100, the manual mode deployment sequence being distinct and separate from the emergency-mode deployment sequence of the automatic deployment module 500, also as will be described in much further detail later below. The retraction module 600 may, according to various embodiments, be configured to return the braking assembly 100 to a stowed configuration from either the emergency-based or manual-based deployment configurations noted above. Of course, the interaction between these various modules 400, 500, 600, and 700 is described in much further detail later below, in the context of various modes of operation of the braking assembly 100.

The system architecture 200 may, according to various embodiments, further include an actuator sensor interface (AS-i) 350 that provides an industrial networking solution for automation based systems that rely, at least in part, on programmable logic controller (PLC)-based or personal computer (PC)-based inputs. The AS-i 350 may be configured in certain embodiments so as to communicate, whether directly or indirectly, with both the control system 205 and the PLC 300. In at least one embodiment, the AS-i 350 may be configured to communicate with the control system 205 via the system interface or bus 235, as previously described herein, while in other envisioned embodiments, the AS-i may communicate over with any of a variety of system components via the network interface 260 and/or the one or more networks 30 (see FIG. 1).

While the foregoing generally describes at least a single processor 230, as one of ordinary skill in the art will recognize, the control system 200 may comprise multiple processors operating in conjunction with one another to perform the functionality described herein. In certain embodiments, as previously noted, the processor 230 may comprise a programmable logic controller (PLC). In those and other embodiments, the PLC may serve to operatively connect the control system 200 and/or AS-i 350 to any of a variety of sensors 300 that may be used to monitor and control certain devices on the vehicle. As a non-limiting example, the PLC may operatively connect an accelerometer configured to detect changes in motion of the vehicle with the control system 200 and/or AS-i 350, such that an operator may be notified as to whether the manual deployment module 600 should be activated, as will be described in further detail below. As another non-limiting example, the PLC's operative connection between the accelerometer and the control system 200 and/or AS-i 350 may be configured to automatically (e.g., without operator involvement) activate the automatic deployment module 500, where emergency conditions are observed, again, as will be described in further detail below. Still other non-limiting examples include the PLC providing an operative connection between a variety of sensors 300 such as the non-limiting examples of one or more brake pressure sensors and one or more wind speed sensors. Such PLCs, as commonly known and understood in the art, may similarly operate electric motors, pneumatic or hydraulic cylinders, magnetic relays, solenoids, springs, actuators, and/or analog outputs, while also providing a human-machine interface (HMI) (e.g., a graphical user interface (GUI)) for configuration, alarm reporting, and everyday control and operation. Such PLCs may also communicate with the control system 200, the AS-i 350, and/or the operator control panel 50 via any combination of the networks 30, system interface, and/or bus 235, as each has been previously described herein.

Structure of Various Embodiments

FIG. 3 illustrates a ground-engaging braking system 5 according to various embodiments of the invention, as mounted to a vehicle such as the non-limiting example of a tractor-trailer rig 60. Another non-limiting example may be the underside of buses, whether in the public transport or school context or otherwise. As may be understood from at least this figure, the ground-engaging braking system 5 generally comprises at least a braking assembly 100, which is positioned on the underside of the trailer bed 62. In certain embodiments, the braking assembly 100 is positioned adjacent a rear portion 64 of the trailer 62, yet nevertheless forward a rear axle 66 of the trailer. In operation when so positioned, the braking assembly 100 is configured to move generally downwardly when deployed and generally upwardly when retracted, as will be described in further detail later.

Turning now to FIG. 4, the braking assembly 100 of the ground-engaging braking system 5 is illustrated, according to various embodiments. As may be understood from this figure, the braking assembly 100 comprises a base subassembly 110, a first linkage subassembly 120, a second linkage subassembly 160, and a pad member 190. In particular embodiments, the pad member 190 is adapted for selective release from at least a portion of the second linkage subassembly for replacement with a new pad member 190, when such may be necessary or desirable due to wear and/or deterioration of the pad member 190 due to use and/or the passage of time. It should be understood that in any of these and other embodiments, the pad member 190 may be formed from an elastomeric material, which have a high coefficient of friction with an engaged roadway. In still other embodiments, the pad member 190 may be formed from any of a variety of materials, elastomeric or otherwise, provided such have a sufficiently high coefficient of friction to provide a desirable degree of friction with the engaged roadway so as to provide a controlled braking for the vehicle, as will be described in further detail below.

Base Subassembly 110

Remaining with FIG. 4, it may be understood that the base subassembly 110 according to various embodiments comprises a pair of elongate cross members 112, a pair of elongate deployment support members 114, at least one elongate retraction support member 116, and a pair of first linkage support members 118. In various embodiments, the base subassembly 110 has a generally planar top surface (shown, but not numbered) that is attached to the underside of the trailer bed 62 (see again FIG. 3). In certain embodiments, the base subassembly 110 is generally square-shaped, as illustrated in at least FIG. 4, although in other embodiments, the base subassembly may be otherwise shaped and/or configured, provided its dimensions remain such that it fits substantially between the side edges of the trailer bed 62 (e.g., it is not wider than the trailer bed).

The base subassembly 110 according to various embodiments is initially formed by configured the pair of elongate cross members 112 and the at least one elongate retraction support member 116 such that at least these features of the subassembly are generally I-shaped. In certain embodiments, the elongate retraction support member 116 is disposed substantially perpendicular to the pair of elongate cross members 112, with opposing ends of the elongate retraction support member being mounted adjacent to (e.g., to) approximately a midpoint of each of the pair of elongate cross members. In this manner, the elongate cross members 112 are generally parallel to one another and spaced apart from one another approximately a distance equivalent to a length of the elongate retraction support member 116. It should be understood that in these and still other embodiments, such a configuration of the base subassembly 110 is designed so as to provide a stabilized and secure mounting interface between the underside of the trailer bed 62 and the first and second linkage subassemblies 120, 160, as will be described in further detail below.

In addition to the centrally disposed elongate retraction support member 116, the base subassembly 110 according to various embodiments further comprises the pair of elongate deployment support members 114. Unlike the retraction support member 116, which is generally centrally disposed relative to the elongate cross members 112, the elongate deployment support members 114 are positioned substantially adjacent opposing edges of the base subassembly 110, one on each side of and substantially parallel to the retraction support member. In this manner, the elongate deployment support members 114 not only provide additional support and stability for the base subassembly 110, but also facilitate positioning of at least two gas springs 103 of a deployment and retraction subassembly 101 (described later herein) so as to provide a uniform deployment force across a width of the base subassembly 110.

Turning for a moment to FIGS. 7 and 9, it may be seen that, according to various embodiments, the elongate deployment support members 114 and the elongate retraction support member 116 are each configured to support various components of a deployment and retraction subassembly 101. In certain embodiments, the deployment and retraction subassembly 101 comprises an actuator 102, one or more gas springs 103, one or more activation plates or pins 104, an ACME nut 105, an ACME screw 107, and one or more retraction plates or pins 108. In at least the illustrated embodiments, the actuator 102, the activation plates or pins 104, the ACME nut 105, the ACME screw 107, and the retraction plates or pins 108 are mounted adjacent (e.g., to) the retraction support member 116, while the one or more gas springs 103 are mounted respectively adjacent (e.g., to) the elongate deployment support members 114. During operative deployment of the braking assembly 100 (as described in detail below), according to various embodiments, movement of the ACME screw nut 105 along the elongate retraction support member 116 releases the activation plates or pins 104, thereby permitting the one or more gas springs 103 to expand. Retraction of the braking assembly 100 (also described in detail below) in these and still other embodiments, is facilitated by the actuator 102 imposing movement upon the ACME screw 107 and associated nut 105 in a direction opposite to that resulting in deployment.

It should be noted at this point that the various features of the deployment and retraction subassembly 101 are generally commonly known and understood in the art. For example, actuators 102 are known and understood to be any type of motor for moving or controlling a mechanism or system, which is operated by a source of energy, usually in the form of an electric current, hydraulic fluid pressure or pneumatic pressure, so as to convert that energy into some form of motion. Similarly, gas springs 103 are known and understood to be a type of spring that uses a compressed gas, contained in a cylinder and compressed by a piston, to exert a force, resulting in movement. Still further, although an ACME screw has been referenced, it should be understood that the use of any power screw thread profile may be incorporated according to various embodiments, As such, while these and other features and components of the deployment and retraction subassembly 101 have been described as noted herein, it should be further understood that any of a variety of alternative features and/or components capable of exerting forces upon and resulting in relative movement of the braking assembly 100 (as will be described further below) may be substituted for any one or more of the herein described components of the deployment and retraction subassembly without departing from the scope and intent of the present invention.

Returning now to FIG. 4, as mentioned, the braking assembly 100 may according to various embodiments further comprise a pair of first linkage support members 118. In certain embodiments, the first linkage support members 118 are mounted adjacent (e.g., to) opposing ends of at least one of the elongate cross members 112, so as to form a base pivot joint thereon for rotation of the first linkage subassembly 120, as will be described in further detail below. Generally speaking, in these and still other embodiments, one end of the first linkage support members 118, namely that disposed furthest from the elongate cross member 112 may comprise one or more holes, configured to receive a joint pin 119 (see also FIG. 5), which thereby forms one of the revolute joints of the first linkage subassembly 120. It should be understood, of course, that certain embodiments may have alternatively configured base subassemblies 110 which may or may not comprise a first linkage support member 118 as described herein, provided at least some portion of the subassembly 110 is configured to provide a base pivot or revolute joint for movement of the first linkage subassembly 120, as will be described in further detail below.

First Linkage Subassembly 120

Turning now to FIG. 5, the first linkage subassembly 120 of the braking assembly 100 according to various embodiments is illustrated in isolation relative to remaining components of the braking assembly (e.g., with at least the base subassembly 110 and the second linkage subassembly 160 either removed or depicted in semi-transparent form). As may be understood from this figure, the first linkage subassembly 120 in certain embodiments comprises a sliding member 122, a pair of coupler members 128, a pair of common members 132, and a first crossbar member 142. With reference to FIG. 8, in these and still other embodiments, the first linkage subassembly 120 may generally form a "four-bar linkage mechanism," as such is commonly known and understood in the art. In at least the illustrated embodiments, the first linkage subassembly 120 should be understood as comprising at least a prismatic joint 150, a first revolute joint 152, a second revolute joint 154, and a third revolute joint 156. Of course, it should be understood that in still other embodiments, the first linkage subassembly 120 may be configured in any of a variety of fashions, provided the desired rotation and translational movements of the braking assembly 100 are provided.

Returning to FIG. 5, the sliding member 122 according to various embodiments is illustrated. With reference also to FIG. 7, it may be seen that the sliding member 122 may be, in certain embodiments, generally elongate, having at least a central notch 123, end portion notches 125, and pin portions 126. As illustrated, the end portion notches 125 of the sliding member 122 are configured to substantially mate with analogously configured portions of the elongate deployment support members 114, as previously described herein. While in at least the illustrated embodiment, the notches 125 and portions of the support members 114 may be configured to form an interlocked "track" upon which the sliding member 122 may travel (e.g., when a force is imposed thereon by the gas springs 103), it should be understood that any of a variety of interfaces may be envisioned, provided such permit relatively free travel between the sliding member 122 and the base subassembly 110 when such movement is desirable.

Still further, according to various embodiments, as best seen in FIG. 5, the central notch 123 of the sliding member 122 is configured to substantially receive at least a portion of the deployment and retraction subassembly 101. In at least the illustrated embodiment, the central notch 123 is configured to substantially mate with at least the ACME screw 107, as previously described herein, such that the sliding member 122 may travel along the screw during retraction motion of the braking assembly 100, as will be described in detail below. As may be seen also from FIG. 7, the pin portions 126 on opposing ends of the sliding member 122 permit relative movement between the sliding member and the adjacently mounted pair of coupler members 128, as the sliding member travels along a path defined by a longitudinal axis of the ACME screw 107. In this manner, it should also be understood that the sliding member 122 is generally configured to be positioned substantially perpendicular relative to the pair of coupler members 128 of the first linkage subassembly 120 so that, in this manner, the sliding member is configured such that its length defines a distance that the coupler members of the first linkage subassembly 120 are spaced apart relative to one another.

Returning now with focus upon FIG. 5, the pair of coupler members 128 is illustrated according to various embodiments. As may be seen, the coupler members 128 are generally elongate and have end holes 130, 131 on opposing ends thereof. With reference to FIG. 8, it should be understood that the end hole 131 is configured to receive the pin portions 126 of the sliding member 122, as previously described, so as to form the first revolute joint 152 of the first linkage subassembly 120. In a similar fashion, the end hole 130 is configured to receive the first crossbar member 142, thereby defining the second revolute joint 154 of the first linkage subassembly. According to these and still other embodiments, the coupler members 128 may be configured in any of a variety of manners, provided the opposing ends thereof are configured to define the aforementioned revolute joints 152, 154 of the first linkage subassembly 120. If should further be noted, however, that the length of the coupler member 128 is such that, when in at least one fully deployed configuration (see FIGS. 10A-C), the coupler member is substantially vertically oriented or slightly there-beyond, so as to inherently "lock" the braking assembly 100 in such deployed configuration, pending application of a positive retraction force thereupon, all as will be described in further detail below.

FIG. 5 also illustrates the configuration of the common member 132 of the first linkage subassembly 120, at least a portion of which also forms a portion of the second linkage subassembly 160, as will be described in further detail below. As may be seen, the common member 132 generally comprises a pair of elongate members 133 (see FIG. 7), each comprising a first portion 134, a second portion 136, and a third portion 138. The first portion 134 according to various embodiments is substantially elongate in shape and configured to extend between the first linkage support member 118 of the base subassembly 110 (as previously described herein) and a pin portion 140 of the common member. In this manner, in certain embodiments, at least one end of the first portion 134 comprises a hole 135, which is configured to receive a pin there-through for selective attachment to the first linkage support member 118. Of course, it should be understood that the first portion 134 of the common member may be otherwise formed; however, such should be configured nevertheless so as to interact with at least a portion of the first linkage support member 118 so as to form the third revolute joint 156 of the first linkage subassembly 120, as previously described herein and illustrated in at least FIG. 8.

Returning to FIG. 5, the second portion 136 of the common member 132 is also illustrated according to various embodiments. In certain embodiments, the second portion 136 may be, as illustrated, integrally formed with the first portion 134 of the common member 132, although in other embodiments, the two may be separately formed, provided they are fixedly mounted adjacent (e.g., to) one another following fabrication. In these and other embodiments, the second portion 136 may be slightly offset relative to the first portion 134, such that the two portions are neither substantially parallel nor substantially perpendicular relative to one another. That being said, in at least the illustrated embodiment, the second portion 136 is offset at approximately a 10 to 20 degree angle relative to a longitudinal axis of the first portion. Of course, alternative configurations may exist in still other embodiments, such that the first and second portions 134, 136 are configured so as to form a portion of both the first and second linkage subassemblies 120, 160.

As also illustrated in FIG. 5, the common member 132 of the first linkage subassembly 120 may according to various embodiments comprise a third portion 138, which is, as previously noted, configured to receive at least a portion of the first crossbar member 142 so as to form the second revolute joint 154 together with the hole 130 of the coupler member 128. In at least the illustrated embodiment, a hole 139 is likewise formed in the third portion of the common member, as described in the coupler member, so as to facilitate formation of the joint 154. Relative movement of the various members around the second revolute joint 154 will be described in further detail below. In these and still other embodiments, however, it should be understood that the third portion 138 of the common member 132 of the first linkage subassembly 120 is configured to extend substantially perpendicular to a longitudinal axis of the first portion 134 of the common member. In this manner, together with its placement substantially adjacent the intersection of the first and second portions 134, 136 of the common member, the third portion 138 provides a degree of offset between the first and second linkage subassemblies 120, 160, so as to prevent interference therebetween during operation and use.

Remaining with FIG. 5, it may be understood that the first portion 134 of the common member 132 may further comprise a hole 135, and the second portion 136 may likewise comprise a hole 137 according to various embodiments. The hole 135 of the first portion 134 may, in certain embodiments, be positioned adjacent an end of the first portion opposing the end that is positioned adjacent the second portion, as previously described herein. Indeed, in the illustrated and still other embodiments, the hold 135 may be configured to further define the third revolute joint 156 (see FIG. 8) of the first linkage subassembly 120 together with the first linkage support member 118 and its associated joint pin 119. In a similar fashion, the hole 137 of the common member 132 may be configured adjacent a peripheral end of the second portion 136, such that it may substantially receive a second crossbar member 144 (see FIG. 6), which forms a portion of the second linkage subassembly 160 by, in particular, forming a second revolute joint 182 thereof (see also FIG. 8). In this manner, however, it should be understood that member 132 is common to (e.g., shared by) both the first and second linkage subassemblies 120, 160, although remaining members of each linkage subassembly are distinct and separate relative to one another.

Second Linkage Subassembly 160

Turning now to FIG. 6, the second linkage subassembly 160 of the braking assembly 100 according to various embodiments is illustrated alongside the first linkage subassembly 120 but with the base subassembly 110 depicted in semi-transparent form. As may be understood from this figure, the second linkage subassembly 160 in certain embodiments comprises the second portion 136 of the common member 132 (see FIG. 5), a crank member 162, a second crossbar member 144, a coupler member 166, and a rocker member 170. As previously described herein, the second portion 136 of the common member 132 comprises a hole 137 configured to receive the second crossbar member 144, which is itself configured as a "pin" of sorts much like the first crossbar member 142, thereby forming the second revolute joint 182 of the second linkage subassembly.

With reference to FIGS. 6-8 in combination, the crank member 162 according to various embodiments is generally elongate and comprises at least a protruding notch 163, a first hole 164, and a second hole 165. With particular reference to FIG. 6, it should be understood that the first hole 164 is configured to receive there-through the second crossbar member 144 that acts as a "pin" forming the second revolute joint 182 between the second portion 136 of the common member 132 and the crank member 162. In a similar fashion, the second hole 165 is configured according to these and still other embodiments to substantially mate with the coupler member 166 so as to form the first revolute joint 180, as will be described in further detail below.

Remaining with FIG. 6 in particular, the protruding notch 163 is configured according to various embodiments to extend outwardly and substantially perpendicularly from substantially a midpoint of the crank member 162. In certain embodiments, the notch 163 is substantially triangular-shaped, while in other embodiments, the notch may be otherwise shaped and sized, as may be desirable, provided such continues to function, as described below. In this regard, it is worth noting that when the braking assembly 100 is deployed into a first deployed configuration 1100 (see also FIGS. 10A-C), the notch 163 is configured such that it impacts at least a portion of the coupler member 166, thereby preventing further relative rotation between the coupler member and the crank member 162 in at least one direction. Such may be seen in particular in FIGS. 10C and 6.

Remaining with FIGS. 6-8, the coupler member 166 according to various embodiments is illustrated. As may be understood from at least FIG. 6, the coupler member 166 is generally elongate and comprises a first hole 167, a second hole 168, and a pair of associated pins 169a, 169b, which together generally form the second revolute joint 182 and a third revolute joint 184 of the second linkage subassembly 160. In certain embodiments, the coupler member 166 may comprise two parallel spaced elongate members, configured to receive there-between at least a portion of the protruding notch 163 of the crank member 162, while in other embodiments, the coupler member may be otherwise configured, provided the notch makes impact therewith, as desirable, to substantially prevent rotation of the two members relative to one another beyond a particular point. In these and still other embodiments, the first hole 167 of the coupler member 166 may be configured to align substantially with the second hole 165 of the crank member 162, with both holes receiving there-through a first of the pair of pins 169a. In a similar fashion, again according to various embodiments, the second hole 165 of the coupler member 166 may be configured to align substantially with a hole 173 on an adjacently positioned rocker member 170. Such configurations may be understood from at least FIGS. 6-8, although it should be further understood that alternative configurations may be contemplated for the crank, coupler, and rocker members of the second linkage subassembly, provided the desirable motion of the braking assembly 100 in its entirety is provided, as will be described in further detail below.

With continued focus on FIGS. 6-8, the rocker member 170 according to various embodiments of the second linkage subassembly 160 is also illustrated. In certain embodiments, the rocker member 170 comprises a pair of elongate rail portions 172, a pad support portion 174, and a coupler joint portion 176. With particular reference to FIG. 6, the pair of elongate rail portions 172 are generally configured to extend upwardly and perpendicular relative to the pad support portion 174, such that a distal end of the elongate portions 172 may be mounted adjacent (e.g., to) the common member 132. In at least the illustrated embodiment, holes 173 of the elongate rail portions 172 are configured to receive therein pin portions 140 of the common member 132, wherein the pin portions extend outwardly and perpendicular relative to a longitudinal axis of the common member, as previously described herein. In this manner, it should be understood that the holes 173 and the pin portions 140 of the common member 132 define a fourth revolute joint 186 of the second linkage subassembly 160.

With continued reference to FIGS. 7-8 in particular, the coupler joint portion 176 of the rocker member 170 may according to various embodiments have a longitudinal axis substantially parallel to that of the elongate rail portion 172 and likewise substantially perpendicular to that of the pad support portion 174, as will be described in further detail below. A hole in a distal portion (relative to the pad support member) of the coupler joint portion 176 (shown but not numbered) is configured to, with the second hole 168 of the coupler member 166 to substantially receive there-through the second of the pair of pins 169*b*, thereby further defining the third revolute joint 184 of the second linkage subassembly 160.

Returning to FIG. 6, the pad support portion 174 of the rocker member 170 is further illustrated according to various embodiments of the second linkage subassembly 160. In certain embodiments, the pad support portion 174 is elongate having a longitudinal axis. Adjacent a top surface (away from the road surface shown, but not numbered) may be mounted the pair of elongate members 170, whether integrally formed with the pad support portion 174, or otherwise, as may be desirable for particular applications. Adjacent an opposing bottom surface (e.g., facing the road surface shown, but not numbered), a pad member 190 may be selectively and detachably attached thereto. In these and still other embodiments, however, it should be understood that the pad support portion 174 of the rocker member 170 may have a length greater than or equal to that of the braking assembly 100 in its entirety, provided the length of the pad support portion is not greater than a width of the trailer portion 62 of the vehicle the assembly is mounted thereto.

Remaining with FIG. 6, the pad support portion 174 of the rocker member 170 may be further configured according to certain embodiments so as to comprise an additional rotation joint (not shown) substantially adjacent the pad 190 attached thereto, as described in further detail below. This additional rotation joint may provide further ability to "wedge" the pad 190 appropriately during automatic deployment mode, as may be desirable for particular applications. As a non-limiting example, the additional rotation joint may permit further rotation of the pad of approximately 20 degrees, relative to an axis of the elongate rail portion 172. Of course, it should be understood that the additional rotation joint is, in at least certain embodiments, an optional configuration, which may not be present in still other embodiments, however may be desirable for particular applications.

Pad 190

As mentioned, with continued reference to any of FIGS. 3-9, the second linkage subassembly 160 of the braking assembly 100, and in particular embodiments the rocker member 170 thereof, may be fitted with a pad 190. In certain embodiments, the pad may be selectively replaceable, as may be desirable for particular applications, while in other embodiments, the pad may be permanently affixed or formed integrally with at least a portion of the rocker member 170. It should be understood however, that in any of these and still other embodiments, the pad 190 is generally configured to extend an entirety of the length of the rocker member 170, as previously described herein. In certain embodiments, the pad 190 may be substantially planar, so as to maximize a surface area ultimately in contact with an engaged road surface; however, in other embodiments, the pad may be formed with a substantially "V" shape, so as to facilitate movement of small debris and/or snow to the side for better road surface engagement. In still other embodiments, the pad 190 may have a tread pattern configured to allow water on the road surface to flow there-through, comparable to any of a variety of tread patterns located on vehicle tires and as commonly known and understood in the art.

According to various embodiments, the pad 190 can be formed from any of a variety of elastomeric materials having a relatively high coefficient of friction. Studs or abrasive particles (not shown) may also be embedded within the pad 190, as may be desirable for particular applications where additional frictional contact with a roadway surface is necessary and/or beneficial. According to these and still other embodiments, the pad 190 may be adhered to the underside of the rocker member 170 of the second linkage subassembly 160 of the braking assembly 100 by any of a variety of suitable adhesive materials, fasteners, or the like.

Miscellaneous

Various embodiments of the braking assembly 100 of at least FIGS. 1-9 have been described herein with regard to certain of their structural characteristics, which define the structural interrelations there-between. It should, however, be understood that the various subassemblies and their associated members as have been described herein may be formed from any of a variety of materials, as may be desirable for particular applications. As a non-limiting example, the various members of the first and second linkage subassemblies 120, 160 may be formed from a metal alloy composition that provides a desirable combination of strength, weather resistance, and light-weight characteristics for the braking assembly 100. In certain embodiments, various pin portions, as have been described elsewhere herein may be comprised of materials substantially different from those of the various members, whereas in other embodiments, the pin portions and the subassemblies and associated members may have substantially the same material composition.

Still further, it should be understood that although the first and second linkage subassemblies 120, 160 have been described herein as forming particular four-bar linkage mechanisms, each comprising specifically defined joints, various alternatives may exist within the scope and content of the present invention, provided such create analogous movement of the braking assembly 100 in its entirety, as will be described in further detail below. For example, while the first linkage subassembly 120 has been described as having a prismatic joint 150, a first revolute joint 152, a second revolute joint 154, and a third revolute joint 156—the respective joints may be alternatively ordered and/or modified, as such may be desirable for particular applications. Similarly, while the second linkage subassembly 160 has been described as having four respective revolute joints 180, 182, 184, and 186, such may likewise be modified, as may be desirable for particular applications, without departing from the scope and intent of the present invention.

Additionally, it should be understood that although the first and second linkage subassemblies 120, 160 have been described and illustrated herein as comprising various linkage members of fixed lengths relative to one another, at least certain embodiments may comprise one or more linkage members configured to be adjustable in length, so as to accommodate variations in vehicle and/or trailer dimensions. As a non-limiting example, the elongate cross members 112 may be configured with a telescoping feature, thereby allowing increase or decrease of their length, depending upon mounting to a particularly sized trailer. As another non-limiting example, one or members of the second linkage subassembly 160 may be likewise adjustable in length, so as to accommodate trailer configurations of differing heights, relative to the ground. While a "telescoping" member, as commonly known and understood in the art, has been described herein as a manner in which to provide adjustable length members, it should be further understood that any of a variety of configurations may be employed, as desirable for various applications.

Operation of Various Embodiments

In various embodiments, the braking assembly 100 is configured for deployment and/or retraction via one or more modes, as illustrated in at least FIGS. 10A-11D. In certain embodiments, at least some portion of the deployment and/or retraction process (e.g., movement of the braking assembly 100 may be performed manually by an operator of a vehicle comprising the braking assembly, while in other embodiments, at least some portion of the deployment and/or retraction process may be performed automatically via a control system 200 having one or more modules, as have been described previously herein. In at least one embodiment, the entirety of a process to implement a particular deployment and/or retraction process is fully automatic, without intervention by the operator. In other embodiments, the entirety of the process may be fully manual, as may be desirable for particular applications. These and still other various possible combinations will be described further below; however, it should be understood that any combination of automatic and/or manual operation may be implemented for operation of the braking assembly 100.

As an initial matter, however, it is worth returning for a moment to FIG. 2, with further reference to FIGS. 12-15, which depict representative process flow charts for execution of the respective automatic deployment, manual deployment, and retraction modules 500-700 of the above-referenced control system 200. Indeed, according to various embodiments, as has been previously referenced herein, the control system 200 may be configured with a home module 400 configured to prompt for user selection of a mode of operation of the braking assembly 100. According to the process flow chart of FIG. 12, the home module 400 is configured, in Step 401, to prompt a user for a mode selection, after which the user or operator may select one of: (a) automatic deployment mode in Step 402; (b) manual deployment mode in Step 404; or (c) retraction mode in Step 406. Once a selection is received in this manner, the home module 400 is configured to one of: (a) notify the automatic deployment module of automatic mode selection in Step 403; (b) notify the manual deployment module of manual mode selection in Step 405; or (c) notify the retraction module of retraction mode selection in Step 407.

With the above in mind, the disclosure proceeds below with a sequential description of each particular mode, detailing not only the relative movements of the structural components of the braking assembly 100 as previously described herein, but the facilitation thereof by the various modules 500-700. Where appropriate, impact upon the deployment and/or retraction mode by the one or more sensors 300 associated with the system is also noted. It should be understood, of course, that selection of one particular mode of operation need not be a "final" in nature selection, as the control system 200 may, according to various embodiments, be further configured to automatically override a user or operator selection where adverse conditions are encountered without warning, and such a capability should be kept in mind relative to the subsequent passages of disclosure.

First Deployment Mode 1100 and Automatic Deployment Module 500

Turning with particular emphasis upon FIGS. 10A-C and 13, a first deployment mode 1100 according to various embodiments is illustrated both pictorially and via a process flowchart. In FIG. 10A, the braking assembly 100 is illustrated in a first stowed configuration 1101, in which the assembly is substantially retracted (e.g., positioned as far away from a road surface upon which the vehicle is traveling as possible) underneath the trailer bed 62 (see FIG. 3). In this stowed configuration, the automatic deployment module 500 of the control system 200 is configured to actively monitor one or more sensors 300 associated with the system in, for example, Step 501 of FIG. 13. As previously described herein, the one or more sensors may be any of a variety of sensors mounted adjacent (e.g., to) and/or associated with the vehicle upon which the braking assembly 100 is mounted. Non-limiting examples of such sensors include accelerometers, pressure sensors, wind speed sensors, and the like, as may be desirable for various applications.

Moving to Step 502 of the first deployment mode 1100, as illustrated in FIG. 13, the automatic module 502 monitors whether one or more alerts have been received from one or more of the sensors. Alerts may be generated by the control system 200, and in particular by the sensors upon occurrence of one or more adverse conditions, as may be predetermined by standard protocols and/or by operator preference. In any case, in any of these and still other embodiments, if and when a sensor alert is generated, the automatic deployment module 500 is configured to activate an automatic mode deployment sequence in Step 503.

With continued reference to FIG. 13, but with further reference to FIG. 10B, the first step executed by the automatic deployment module 500, upon identification of a sensor alert (e.g., in Step 502) according to various embodiments, is to deploy the first linkage subassembly 120 according to Step 504. As may be understood from FIG. 10B, deployment of the first linkage subassembly 120, when in the first deployment mode 1100 of certain embodiments, involves an initial translation movement 1102 of the sliding member 122 (e.g., by movement of the ACME nut 105 so as to release one or more pins holding back the sliding member, thereby permitting the gas springs 103 to expand, as previously described herein) in a substantially rearward direction (e.g., toward the axle of the trailer bed 62) and in a plane substantially parallel to the trailer bed.

As may be understood from FIG. 10B, the initial translational movement 1102 of the sliding member 122 results in not only a slight rotational movement of the coupler member 128 in a substantially rearward direction, but also a rotational movement 1103 of the first portion 134 of the common member 132 of the first linkage subassembly 120 in a substantially forward (e.g., away from the axle 66) and downward direction. In certain embodiments, upon completion of the translational movement 1102, the coupler member 128 moves just beyond a vertical orientation, as measured relative to the underside of the trailer bed 62 and/or the underlying road surface. Once so positioned, the coupler member 128 in these and other embodiments inherently "locks" the first linkage subassembly 120 in the first intermediate configuration 1120 of FIG. 10B. It should be understood that in these and still other embodiments, "unlocking" of the first linkage subassembly 120 from this intermediate configuration 1120 cannot occur inadvertently, but instead requires some degree of positive force to be exerted thereupon, for example, via at least the actuator 102 and ACME screw 107 components of the deployment and retraction subassembly 101 as previously described herein. Such "unlocking" and subsequent retraction operations will likewise be discussed in further detail later below.

Returning now to FIG. 13, once the automatic module 500 of the control system 200 has completed deployment of the first linkage subassembly 120 in Step 504, the module proceeds to deploy the second linkage subassembly 160 according to Step 505. With reference to FIGS. 10B-C, deployment of the second linkage subassembly from the first intermediate configuration 1120 (see FIG. 10B and description further above) and to a first deployed configuration 1125 is illustrated according to various embodiments. In certain embodiments, this process (e.g., Step 505) begins with a rotational movement 1104 of the rocker member 170 of the second linkage subassembly 160 in a substantially downward and rearward direction (e.g., toward the road surface and the rear axle 66 of the trailer bed 62).

During Step 505 (see FIG. 13), deployment of the second linkage subassembly 160 further results in a rotational movement 1105 of the crank member 162 in a counterclockwise direction, as viewed relative to FIG. 10C. According to various embodiments, this counterclockwise rotational movement 1105 of the crank member 162 continues unimpeded until the notch 163 (see FIG. 6) of the crank member contacts (e.g., makes impact with) a portion of the coupler member 166 of the second linkage subassembly. In certain embodiments, impact between the notch 163 and the coupler member 166 occurs substantially as the rotational movement 1104 of the rocker member 170 causes the pad member 190 to likewise impact the road surface over which the trailer bed 62 is traveling. In this manner, according to these and still other embodiments, as the second linkage subassembly 160 reaches this first deployed configuration 1125, the braking assembly 100 in its entirety is "locked" such that the pad member 190 is retained firmly against the road surface, thereby facilitating stabilization of the trailer bed 62 and/or stoppage of the vehicle associated therewith. Notably, the rotational movement 1104 of the rocker member 170 in these and still other embodiments occurs substantially via gravity alone, without need for external devices imposing a positive force thereupon.

Returning momentarily to FIG. 13, it may be seen that the automatic module 500, upon deploying the second linkage subassembly 160 to the first deployed configuration 1125 (see FIG. 10C) is configured itself according to various embodiments to, in Step 506 to monitor whether the vehicle and/or trailer bed 62 have stopped as a result of the deployment. If the module 500 determines that the vehicle remains unstopped and/or un-stabilized, the module maintains the deployment configuration 1125 in Step 507 until if/when the module determines otherwise. In any of these and still other embodiments, once the automatic module 500 determines that the vehicle has stopped and/or stabilized per Step 506, the module then proceeds to Step 508 in which the refraction module 700 is notified that retraction may proceed. In certain embodiments, retraction may likewise occur automatically, as will be described in further detail below, while in other embodiments, retraction may occur at least in part manually, upon selection and/or additional action by the operator of the vehicle. In at least one embodiment, the operator may need to reverse movement of the vehicle (e.g., drive in reverse) for at least a certain distance so as to "un-wedge" the pad portion of the second linkage subassembly 160 from the road surface, prior to commencing the retraction process.

Second Deployment Mode 1200 and Manual Deployment Module 600

Turning now to FIGS. 11A-D and 14, a second deployment mode 1200 according to various embodiments is illustrated both pictorially and via a process flowchart. In FIG. 11A, the braking assembly 100 is illustrated in a second stowed configuration 1201, in which the assembly is retracted in substantially the same manner as previously described herein with regard to the first stowed configuration 1101. Indeed, the two respective stowed configurations are duplicated merely for simplicity of disclosure and should not be considered to possess any meaningful distinctions relative to one another. That being said, it should be understood that in either of the stowed configurations 1101, 1201, the manual deployment module 600 of the control system 200 (see FIG. 2) is configured to actively monitor the home module 400 (as previously described herein) and/or the operator controlled device 40 to determine whether the second deployment (e.g., manual deployment) mode is invoked by the operator of the vehicle. Although such monitoring in Step 601 by the manual deployment module 600 is described as an alternative to the monitoring in Step 501 by the automatic deployment module 500, it should further be understood that according to certain embodiments, both modules may be executed simultaneously. Indeed, as a non-limiting example, the automatic module 500, upon identification of an adverse condition or receipt of a sensor alert (see Step 502) may be configured in various embodiments to automatically override the manual deployment module 600 and activate the automatic mode deployment sequence, as previously described herein. Such should be considered in these and still other embodiments as a safety override, of sorts.

With that in mind and turning to Step 602, the manual module 600 according to various embodiments, as illustrated in FIG. 14, determines whether manual mode has been activated by a user or operator of the vehicle upon which the braking assembly 100 is mounted. As mentioned, activation may be by user selection of the mode via one or more GUI displays on the operator control panel 50, as previously described herein, or via user operation of the operator controlled device 40. In at least the illustrated embodiment, wherein the operator controlled device 40 comprises a lever mechanism, activation of the manual mode deployment may be invoked by the operator selectively adjusting the lever mechanism.

With continued reference to FIG. 14, but with further reference to FIG. 11B, the first step executed by the manual deployment module 600, upon user activation thereof (e.g., in Step 602) according to various embodiments, is activation of the manual mode deployment sequence in Step 603, followed by deployment of the second linkage subassembly 160 in Step 604. As may be understood from FIG. 11B, deployment of the second linkage subassembly 160, when in the second deployment mode 1200 of certain embodiments, involves an initial rotational movement 1202 of the rocker member 170 of the second linkage subassembly. In various embodiments, the initial rotational movement 1202 results in a rotation of the rocker member 170 in a rearward and downward direction, as illustrated in FIG. 11B.

With continued reference to FIG. 11B, it should be understood that the initial rotational movement 1202 of the rocker member 170 results substantially simultaneously in a rotational movement 1203 of the crank member 162 and the coupler member 166. According to various embodiments, it should be understood that the rotational movement 1203 of the crank member 162 is in a substantially clockwise direction, as illustrated in FIG. 11B, notably directly opposite the counterclockwise rotation of the crank member previously described herein in the context of the automatic deployment mode 1100. In this manner, the notch 163 of the crank member 162 does not impact the coupler member 166, as during the automatic deployment mode 1100 sequence, but instead rotates oppositely—from the first intermediate configuration 1220 of FIG. 11B to the second intermediate configuration 1222 of FIG. 11C.

Turning with particular emphasis upon FIG. 11C, according to various embodiments, the second intermediate configuration 1222 of the braking assembly 100 results as the rocker member 170 rotates past a vertical orientation relative to the underside of the trailer bed 62. When such occurs in these and other embodiments, the downward and rearward rotational movement 1202 converts into an upward and rearward rotational movement 1204 of the rocker member 170. As such occurs, the crank member 162 is likewise further rotated in a clockwise direction via additional rotational movement 1205.

Returning for a moment to FIG. 14, once the manual deployment module 600 has deployed the second linkage subassembly 160 according to Step 604 and as described immediately above in the context of FIGS. 11B-C, the manual deployment module proceeds in Step 605 to deploy the first linkage subassembly 120 in much the same manner as previously described herein in the context of the automatic deployment module 500 and FIGS. 10A-B. Of course, the manual deployment of the first linkage subassembly 120 occurs secondary to that of the second linkage subassembly 160 during manual deployment. With that in mind, reference to FIG. 11D illustrates the translational movement 1206 of the sliding member 122 and the coupler member 128, along with the rotational movement 1207 of the first portion 134 of the common member 132 of the first linkage subassembly 120. It should be noted that in at least the illustrated and still other embodiments, these movements 1206, 1207 are substantially the same as movements 1102, 1103, as previously described herein.

With continued reference to FIGS. 11D and 14, upon placement of the braking assembly 100 into the second deployment configuration 1225 (see FIG. 11D), the manual deployment module 600 is according to various embodiments configured to notify the user that manual mode deployment has been completed, via Step 606 of FIG. 14. Upon notification, the user may manually adjust the contact pressure between the pad member 190 and the road surface therebelow. In certain embodiments, the user adjustment may be via the operator controlled device 40, wherein the user may depress a lever mechanism further when an increased contact pressure is desirable and release the lever mechanism a certain degree when less pressure is desirable. As should be understood from FIG. 11D, in these and still other embodiments, the user adjustment noted above further imposes a rotational movement 1210 upon the crank member 162, which in turn imposes a corresponding rotational movement 1208 upon the rocker member 170 (and thus the pad member 190). In certain embodiments, the rotational movement 1210 upon the crank member 162 is imposed by an electric actuator rotating the same, based upon signals received via the control system 200, all as previously described herein. Of course, in other embodiments, any of a variety of actuators and/or comparable devices capable of imposing a force upon the crank member 162 may be employed, as commonly known and understood in the art.

Remaining with FIG. 11D, it should be understood that according to various embodiments, the user or operator of the vehicle upon which the braking assembly 100 is mounted may selectively adjust the contact pressure between the pad member 190 and the adjacently positioned road surface by imposing upon the crank member 162 a "rocking" motion, generally depicted and described elsewhere herein as rotational movement 1210. In this manner, the user or operator may selectively remove and apply a desired degree of contact pressure so as to manually bring the vehicle under controlled conditions relative to observed and/or encountered adverse conditions.

Notably, while the operation of the braking assembly 100 via the control system 200 has been described herein as alternatively proceeding under either the automatic deployment mode 1100 or the manual deployment mode 1200, it should be understood that the two modes may be simultaneously monitored and/or operated by, for example, the home module 400 such that should a predetermined adverse condition requiring automatic deployment occur, the automatic deployment module 600 may be configured in such instances to automatically override the manual deployment module 700 and proceed immediately with the emergency-based deployment process, for purposes of safety and security. Of course, such an additional safety feature may not be desirable in all instances, in which case, according to certain embodiments, the two modules, along with the retraction module 700, as described elsewhere herein may be configured to be wholly independently operated. Still further, any of a variety of combinations of configurations may be envisioned, as within the scope and content of the present invention.

Retraction Mode and Associated Retraction Module 700

Turning now to FIG. 15 and with continued peripheral reference to FIGS. 10A-11D, the retraction module 700, as such is configured to facilitate retraction of the braking assembly 100 from either of the first or the second deployed configurations 1125, 1225 is illustrated. According to various embodiments, the retraction module 700 is configured to monitor the automatic deployment module 500 and the manual deployment module 600 to identify whether any notifications have been received therefrom (e.g., during Step 609 or Step 508, as illustrated in each of FIGS. 13 and 14, respectively). In step 710, if a notification is received from the automatic deployment module 500, the retraction module 700 proceeds beyond Step 710 (see FIG. 15) to activate, via Step 711, an automatic mode retraction sequence. If, alternatively, via the monitoring of Step 701, the retraction module 700 receives a notification from the manual deployment module 600 (see Step 720), the retraction module proceeds to Step 721, during which a manual mode retraction sequence is activated. Each of these sequences will be described in further detail below; however, it should be understood that inn at least one embodiment, the operator may need to reverse movement of the vehicle (e.g., drive in reverse) for at least a certain distance so as to "un-wedge" the pad portion of the second linkage subassembly 160 from the road surface, prior to commencing at least the "manual" retraction process.

Continuing with reference to FIG. 15, together with FIGS. 10A-C, if the automatic mode retraction sequence is activated in Step 711, the retraction module 700 proceeds in Step 712 to retract the second linkage mechanism 160 from the first deployed configuration 1125 of FIG. 10C to the intermediate deployed configuration 1120 of FIG. 10B, both as previously described herein. Of course, such retraction results in the respective rotational movements 1105 and 1104, also as previously described herein, but in substantially the opposite order as encountered during the automatic deployment sequence of FIG. 13. It should be understood that according to various embodiments, an electric actuator or other comparable device or combination of devices may be configured to result in the retraction of the second linkage mechanism 160 during Step 712, although such was originally deployed, as previously described herein, in at least certain embodiments, via gravity alone.

Once in the intermediate configuration 1120 of FIG. 10B, the retraction module 700 is configured according to various embodiments, to next, execute Step 713 of FIG. 15 such that the first linkage mechanism 120 is likewise retracted. In certain embodiments, retraction of the first linkage mechanism 120 is accomplished via the ACME screw 107 and electric actuator 102, as previously described herein, such that at least the screw and actuator of the deployment and retraction subassembly 101 (see FIG. 7) force the sliding member 122 in a direction substantially opposite that shown by arrow 1102 in FIG. 10B. In this manner, the slider member 122 translates back to the stowed configuration, while the first portion 134 of the common member 132 likewise rotates in a direction opposite that depicted by arrow 1103 of FIG. 10B. Ultimately, in any of these and still other embodiments, the retraction module 700 returns the braking assembly 100 to its stowed configuration 1101 (see FIG. 10A) and upon doing so, may be configured to notify the user or operator of the vehicle that retraction is complete during Step 714. (see FIG. 15).

Comparable to the process described above, wherein the braking assembly 100 may be retracted from an automatic deployment configuration to a stowed configuration, retraction may also occur during Steps 721-724 of FIG. 15 from the manual deployed configuration (e.g., that permitting "rocking" of the crank member 162 by the user) to the stowed configuration. Notably, the retraction process in this context, much like that in the automatic deployment context, substantially follows a reversal of the deployment process previously described herein with reference to FIGS. 11A-D and 14. As a non-limiting example, consider FIGS. 11C-D, wherein retraction of the braking assembly 100 from the illustrated manual deployed configuration 1225 would involve translational movement of the sliding member 122 in a direction to the reverse of that of arrow 1206, which would result further in rotation of the first portion 134 of the common member 132 in a direction to the reverse of that of arrow 1207. Such is analogous to the retraction of the first linkage subassembly 120 described above with reference to FIGS. 10A-C, with the distinction that from the manual deployed configuration 1225, retraction of the first linkage subassembly occurs prior to retraction of the second linkage subassembly, which process is opposite that encountered during the automatic retraction process, as previously described herein.

Turning now to FIGS. 11A-C, it should be further understood that according to various embodiments the retraction module 700 may be then configured, during continued retraction of the braking assembly 100 to retract the second linkage mechanism 160 successively between the intermediate configuration 1222 of FIG. 11C, the intermediate configuration 1220 of FIG. 11B, and the stowed configuration 1201 of FIG. 11A. When so doing in these and other embodiments, relative rotational movement of the second linkage mechanism 160 is caused, substantially in directions oppose those depicted by arrows 1205, 1203, and 1202. As a non-limiting example, it should be understood that during retraction from the manual deployment mode 1200, the crank member 162 of the second linkage subassembly 160 rotates in a counterclockwise direction (e.g., opposite the direction of arrow 1205). Such should be contrasted with the clockwise rotational movement (e.g., opposite the direction of arrow 1105), which is encountered by the crank member 162 during refraction from the automatic deployment mode 1100.

It should be further understood that although the retraction module 700 and its processes have been described herein as being configured to return the braking assembly 100 to a stowed configuration (e.g., 1101 or 1201 of FIGS. 10-11) from a particular deployed configuration (e.g., 1125, 1225 of FIGS. 10-11), in certain embodiments and under certain external conditions, the return to the stowed configuration may be from any of a variety of positions other than the stowed configuration. For example, should the braking assembly 100 be partially deployed in the manual deployment mode 1200 to the first intermediate configuration 1220 or even somewhere between that configuration and the second intermediate configuration 1222 and an adverse condition causes the automatic deployment module 600 to active, the retraction module 700 may be likewise configured to cause movement of the braking assembly 100 so as to most efficiently and timely place the assembly into its desired deployed configuration. In certain instances, it should be understood that this may or may not require an intermediate return to a completely stowed configuration, although in other embodiments, such may be required to, for example, ensure appropriate rotation of the crank member 162 (e.g., clockwise versus counterclockwise) according to a desirable configuration, all of course as has been described elsewhere herein.

Miscellaneous

It should be understood that although two specific modes of operation, involving two distinct deployment procedures and particular rotations of the first linkage subassembly 120 and the second linkage subassembly 160 have been described herein, such may have applications in a variety of scenarios. As a non-limiting example, as previously alluded to herein, the automatic deployment mode may be configured to activate upon occurrence of or encounter with one or more adverse driving conditions, as may be predetermined by a user, operator, or other entity involved with the operation of the braking assembly 100. Of course, the braking assembly may be configured according to various embodiments for manual use to assist a driver of an associated vehicle with maintaining safe and/or controlled operation of the vehicle, under any of a variety of conditions, whether adverse or otherwise. Still further, the braking assembly may be configured such that the automatic deployment mode may be activated upon notification of the vehicle being stolen or otherwise misused, whereby auto-deployment techniques may be employed to bring the stolen or otherwise misused vehicle to a halt, contrary to the desires of a particular user of the vehicle at that time. Of course, still further applications of the braking assembly 100 may be envisioned and such should be considered within the scope and content of the various embodiments described more fully elsewhere herein.

CONCLUSION

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A ground-engaging vehicle braking assembly for a vehicle, the assembly comprising:
   a base subassembly mounted to a portion of the vehicle;
   a common member comprising a first portion and a second portion, the first portion of the common member being rotatably attached to the base subassembly;

a first linkage subassembly comprising the first portion of the common member and defining a four-bar linkage mechanism; and a second linkage subassembly comprising:
the second portion of the common member and a pad member, the pad member being configured to engage a ground surface over which the portion of the vehicle is travelling;
a deployment and retraction subassembly;
a coupler member comprising a first portion and a second portion, the first portion of the coupler member being rotatably attached to an intermediate portion of the common member; and
a sliding member being rotatably attached to the second portion of the coupler member, the sliding member being further translationally attached to the deployment and retraction subassembly.

2. The ground-engaging vehicle braking assembly of claim 1, wherein the deployment and retraction subassembly comprises one or more gas springs fixedly attached to the base subassembly, such that the one or more gas springs are configured to impose a translational force in a first direction upon the sliding member.

3. The ground-engaging vehicle braking assembly of claim 2, wherein the deployment and retraction subassembly further comprises a threaded member fixedly attached to the base subassembly, such that the threaded member is configured to impose a translational force in a second direction upon the sliding member, the second direction being substantially opposite that of the first direction.

4. The ground-engaging vehicle braking assembly of claim 1, wherein the four-bar linkage mechanism comprises:
a prismatic joint formed by the translational attachment between the sliding member and the deployment and retraction subassembly;
a revolute joint formed by the rotatable attachment between the sliding member and the coupler member;
a revolute joint formed by the rotatable attachment between the coupler member and the intermediate portion of the common member; and
a revolute joint formed by the rotatable attachment between the first portion of the common member and the base subassembly.

5. The ground-engaging vehicle braking assembly of claim 1, wherein the second linkage subassembly further comprises:
a rocker member having a first portion, a second portion, and an intermediate portion, the first portion of the rocker member being rotatably attached to an intermediate portion of the common member, the intermediate portion of the common member being substantially between the first portion and the second portion of the common member;
a crank member comprising a first portion, a second portion, and a protrusion, the protrusion being positioned substantially between the first portion and the second portion, the first portion of the crank member being rotatably attached to the second portion of the common member; and
a coupler member comprising a first portion and a second portion, the first portion of the coupler member being rotatably attached to the second portion of the crank member, the second portion of the coupler member being rotatably attached to the intermediate portion of the rocker member, and the intermediate portion of the rocker member being substantially between the first portion and the second portion of the rocker member.

6. The ground-engaging vehicle braking assembly of claim 5, wherein the second portion of the rocker member is configured to substantially mate with the pad member of the second linkage subassembly.

7. The ground-engaging vehicle braking assembly of claim 5, wherein the second linkage subassembly defines a four-bar linkage mechanism.

8. The ground-engaging vehicle braking assembly of claim 7, wherein the four-bar linkage mechanism comprises:
a revolute joint formed by the rotatable attachment between the intermediate portion of the common member and the first portion of the rocker member;
a revolute joint formed by the rotatable attachment between the second portion of the common member and the first portion of the crank member;
a revolute joint formed by the rotatable attachment between the second portion of the crank member and the first portion of the coupler member; and
a revolute joint formed by the rotatable attachment between the second portion of the coupler member and the intermediate portion of the rocker member.

9. The ground-engaging vehicle braking assembly of claim 1, wherein the second linkage subassembly further comprises:
a rocker member having a first portion, a second portion, and an intermediate portion, the first portion of the rocker member being rotatably attached to the intermediate portion of the common member;
a crank member comprising a first portion, a second portion, and a protrusion, the protrusion being positioned substantially between the first portion and the second portion, the first portion of the crank member being rotatably attached to the second portion of the common member; and
a coupler member comprising a first portion and a second portion, the first portion of the coupler member being rotatably attached to the second portion of the crank member, the second portion of the coupler member being rotatably attached to the intermediate portion of the rocker member, and the intermediate portion of the rocker member being substantially between the first portion and the second portion of the rocker member.

10. The ground-engaging vehicle braking assembly of claim 9, wherein:
the first linkage subassembly defines a first four-bar linkage mechanism;
the second linkage subassembly defines a second four-bar linkage mechanism; and
the first and the second four-bar linkage mechanisms commonly share at least a portion of the common member.

11. A method of operating a ground-engaging vehicle braking assembly for a vehicle, the method comprising the steps of:
providing a ground-engaging vehicle braking assembly, the assembly comprising a base subassembly and a common member having a first portion and a second portion, the first portion forming at least a portion of a first linkage subassembly, the second portion forming at least a portion of a second linkage subassembly;
moving the first linkage subassembly from a first configuration to a second configuration, such that at least the first portion of the common member rotates relative to the base subassembly; and
moving the second linkage subassembly from a first configuration to a second configuration, such that at least a portion of the second linkage subassembly engages a ground surface over which the vehicle is traveling, wherein:
the portion of the second linkage subassembly that engages the ground surface over which the vehicle is traveling when in the second configuration comprises a pad member selectively attached to a rocker member of the second linkage subassembly; and
the step of moving the second linkage subassembly from the first and to the second configuration comprises rotating the rocker member into the second configuration, such that the pad member substantially engages the ground surface.

12. The method of claim 11, wherein the step of moving the first linkage subassembly from the first and to the second configuration further comprises translating a sliding member of the first linkage subassembly in a plane substantially parallel to that of the base subassembly.

13. The method of claim 12, wherein the ground-engaging vehicle braking assembly further comprises one or more gas springs and the step of translating the sliding member is performed by the one or more gas springs exerting a force upon the sliding member, the force being exerted in the plane substantially parallel to that of the base subassembly.

14. The method of claim 11, wherein:
the first linkage subassembly further comprises a coupler member; and
movement of the first linkage subassembly into the second configuration rotates the coupler member substantially beyond a perpendicular orientation relative to the base subassembly, such that the first linkage subassembly is substantially locked into the second configuration.

15. The method of claim 11, wherein the step of moving the second linkage subassembly from the first and to the second configuration:
occurs subsequent to the step of moving the first linkage subassembly into the second configuration; and
comprises rotating a crank member of the second linkage subassembly in a counterclockwise direction until a protrusion of the crank member substantially engages a portion of a coupler member of the second linkage subassembly, thereby preventing further rotation of the rocker member out of the second configuration.

16. The method of claim 15, wherein the second configurations of the first and the second linkage subassemblies collectively define a deployment configuration of the ground-engaging braking assembly.

17. The method of claim 16, wherein the deployment configuration is achieved via a computer processor configured to:
monitor one or more sensors; and
upon detection of one or more predetermined parameters associated with the one or more sensors, to automatically perform the steps of moving the first and the second linkage subassemblies into the deployment configuration.

18. The method of claim 17, wherein the computer processor is further configured to further perform steps of moving the first and the second linkage subassemblies from the deployment configuration to a stowed configuration, the stowed configuration being collectively defined by the first configurations of the first and the second linkage subassemblies.

19. The method of claim 11, wherein the step of moving the second linkage subassembly into the second configuration:
occurs prior to the step of moving the first linkage subassembly into the second configuration; and
comprises the steps of:
rotating the rocker member into a third configuration prior to rotating into the second configuration, the second configuration being intermediately positioned relative to the first and the third configurations;
rotating a crank member of the second linkage subassembly in a clockwise direction until the second linkage subassembly reaches the third configuration; and
rotating the crank member in a counterclockwise direction until the second linkage subassembly reaches the second configuration, such that the pad member substantially engages the ground surface.

20. The method of claim 19, wherein the second configurations of the first and the second linkage subassemblies collectively define a deployment configuration of the ground-engaging braking assembly.

21. The method of claim 20, wherein the deployment configuration is achieved via a computer processor configured to:
monitor an operator controlled device; and
upon detection of one or more predetermined parameters associated with the operator controlled device to automatically perform the steps of moving the first and the second linkage subassemblies into the deployment configuration.

22. The method of claim 21, wherein the operator controlled device is an actuated lever mechanism configured such that the mechanism selectively rotates the crank member of the second linkage subassembly in the clockwise and the counterclockwise direction so as to selectively engage the pad member with the ground surface.

23. A system providing a ground-engaging vehicle braking assembly for a vehicle, the system comprising:
a ground-engaging vehicle braking assembly, the assembly comprising a base subassembly and a common member having a first portion and a second portion, the first portion forming at least a portion of a first linkage subassembly, the second portion forming at least a portion of a second linkage subassembly;
at least one actuator; and
at least one processor configured to:
monitor at least one of an operator controlled device and one or more sensors;
in response to identifying one or more predetermined parameters associated with the one or more sensors, first move the first linkage subassembly from a first configuration and into a second configuration and then move the second linkage subassembly from a first configuration and into a second configuration, such that at least a portion of the second linkage subassembly substantially engages a ground surface over which the vehicle is traveling; and
in response to identifying one or more predetermined parameters associated with the operator controlled device, first move second linkage subassembly from the first configuration and into a third configuration, the second configuration being intermediately positioned relative to the first and the third configurations, then move the first linkage subassembly from the first configuration and into the second configuration, and then move the second linkage subassembly from the third configuration and into the second configuration, such that at least a portion of the second linkage subassembly substantially engages a ground surface over which the vehicle is traveling.

24. The system of claim 23, wherein:
in response to identifying one or more predetermined parameters associated with the one or more sensors, the processor is configured to move the ground-engaging braking assembly into a first deployed configuration, such that the portion of the second linkage subassembly substantially engages the ground surface over which the vehicle is traveling; and in response to identifying one or more predetermined parameters associated with the operator controlled device, the processor is configured to move the ground-engaging braking assembly into a second deployed configuration, such that the portion of the second linkage subassembly that may substantially engages the ground surface over which the vehicle is traveling is positioned such that the ground-engaging braking assembly may be selectively moved so as to engage or disengage the ground surface.

* * * * *